United States Patent
Seo

(10) Patent No.: US 12,285,759 B2
(45) Date of Patent: Apr. 29, 2025

(54) ROTARY INTEGRATED MICRO-DEVICE FOR GENE DIAGNOSIS

(71) Applicant: UNIVERSITY-INDUSTRY COOPERATION GROUP OF KYUNG HEE UNIVERSITY, Yongin-si (KR)

(72) Inventor: Tae Seok Seo, Suwon-si (KR)

( * ) Notice: Subject to any disclaimer, the term of this patent is extended or adjusted under 35 U.S.C. 154(b) by 720 days.

(21) Appl. No.: 17/296,984

(22) PCT Filed: Sep. 4, 2019

(86) PCT No.: PCT/KR2019/011370
§ 371 (c)(1),
(2) Date: May 26, 2021

(87) PCT Pub. No.: WO2020/111462
PCT Pub. Date: Jun. 4, 2020

(65) Prior Publication Data
US 2022/0008925 A1 Jan. 13, 2022

(30) Foreign Application Priority Data
Nov. 29, 2018 (KR) .......................... 10-2018-0150621

(51) Int. Cl.
*B01L 3/00* (2006.01)
*B01F 23/00* (2022.01)
(Continued)

(52) U.S. Cl.
CPC .. *B01L 3/502761* (2013.01); *G01N 35/00069* (2013.01); *G01N 35/085* (2013.01);
(Continued)

(58) Field of Classification Search
CPC ....... B01L 3/502761; B01L 2200/0647; B01L 2200/10; B01L 2300/069;
(Continued)

(56) References Cited

U.S. PATENT DOCUMENTS

2007/0036679 A1* 2/2007 Munenaka .......... B01L 3/50273
422/68.1

FOREIGN PATENT DOCUMENTS

KR 10-2013-0054075 A 5/2013
KR 10-2013-0126350 A 11/2013
(Continued)

OTHER PUBLICATIONS

English Machine Translation of KR 20130126350 A, obtained from Google Patents on Mar. 18, 2024, pp. 1-7. (Year: 2024).*
(Continued)

*Primary Examiner* — Jennifer Wecker
*Assistant Examiner* — Oyeleye Alexander Alabi

(57) ABSTRACT

Disclosed is a genetic diagnosis chip. The genetic diagnosis chip includes one or more unit processing parts, wherein the unit processing part includes a pretreatment unit that loads a sample and performs a pretreatment process on a target material in the loaded sample, and a distribution unit which is located radially outward from the pretreatment unit and in which the target material pretreated through the pretreatment unit is distributed and detection of the distributed target material is performed, the pretreatment unit includes a sample loading unit that loads the sample, and a capture channel which captures the target material from the loaded sample, and the sample loading unit is formed on the capture channel.

10 Claims, 22 Drawing Sheets

(51) Int. Cl.
| | |
|---|---|
| B01F 23/41 | (2022.01) |
| B01F 101/23 | (2022.01) |
| B23Q 17/24 | (2006.01) |
| C07K 14/705 | (2006.01) |
| C12M 1/34 | (2006.01) |
| C12Q 1/04 | (2006.01) |
| C12Q 1/18 | (2006.01) |
| C12Q 1/686 | (2018.01) |
| G01N 21/3577 | (2014.01) |
| G01N 21/359 | (2014.01) |
| G01N 21/39 | (2006.01) |
| G01N 21/45 | (2006.01) |
| G01N 21/64 | (2006.01) |
| G01N 21/77 | (2006.01) |
| G01N 21/78 | (2006.01) |
| G01N 27/414 | (2006.01) |
| G01N 30/12 | (2006.01) |
| G01N 30/68 | (2006.01) |
| G01N 30/70 | (2006.01) |
| G01N 30/72 | (2006.01) |
| G01N 30/88 | (2006.01) |
| G01N 33/00 | (2006.01) |
| G01N 33/18 | (2006.01) |
| G01N 33/50 | (2006.01) |
| G01N 33/53 | (2006.01) |
| G01N 33/543 | (2006.01) |
| G01N 33/68 | (2006.01) |
| G01N 33/74 | (2006.01) |
| G01N 35/00 | (2006.01) |
| G01N 35/08 | (2006.01) |
| G01N 35/10 | (2006.01) |
| G06K 7/10 | (2006.01) |
| G06K 7/14 | (2006.01) |
| G06K 19/06 | (2006.01) |
| G06K 19/07 | (2006.01) |
| G06T 7/00 | (2017.01) |
| G06T 7/90 | (2017.01) |
| H10K 10/46 | (2023.01) |
| H10K 85/00 | (2023.01) |
| H10K 85/20 | (2023.01) |

(52) U.S. Cl.
CPC ... B01L 2200/0647 (2013.01); B01L 2200/10 (2013.01); B01L 2300/069 (2013.01); B01L 2300/0803 (2013.01); B01L 2300/0819 (2013.01); B01L 2300/0861 (2013.01); G01N 2035/00158 (2013.01)

(58) Field of Classification Search
CPC ..... B01L 2300/0803; B01L 2300/0819; B01L 2300/0861; B01L 7/52; B01L 2200/16; B01L 2400/0409; B01L 3/50273; B01L 2300/12; G01N 35/00069; G01N 35/085; G01N 2035/00158
See application file for complete search history.

(56) References Cited

FOREIGN PATENT DOCUMENTS

| KR | 20130126350 A | * | 11/2013 | ........ B01L 3/502715 |
|---|---|---|---|---|
| KR | 10-2014-0093084 A | | 7/2014 | |
| KR | 20150145162 A | * | 12/2015 | ............ C12Q 1/686 |
| KR | 10-2018-0022167 A | | 3/2018 | |

OTHER PUBLICATIONS

English Machine Translation of KR 20150145162A, obtained from Google Patents on Mar. 18, 2024, pp. 1-33. (Year: 2024).*
Seo, T. S., "A Fully integrated centrifugal Microfluidic Platforms for point-of-care Molecular Diagnostics". 6th International Symposium on Process Intensification, Nov. 2018.
Office Action of KR 10-2018-0150621 mailed on Aug. 30, 2020.
Notice of Allowance of KR 10-2018-0150621 mailed on Mar. 30, 2021.
International Search Report for PCT/KR2019/011370 mailed on Dec. 12, 2019.
International Application Status Report published on Jun. 4, 2020.

* cited by examiner

ROTARY INTEGRATED MICRO-DEVICE FOR GENE DIAGNOSIS

CROSS-REFERENCE TO RELATED APPLICATION

This application claims priority to and the benefit of Korean Patent Application No. 10-2018-0150621 filed on Nov. 29, 2018, the disclosure of which is incorporated herein by reference in its entirety.

BACKGROUND

1. Field of the Invention

The present disclosure relates to an integrated micro-device for diagnosis, and more particularly, to a rotational integrated micro-device for genetic diagnosis capable of all genetic diagnoses with a single chip.

2. Discussion of Related Art

Genetic diagnoses are essential for diagnosing diseases of bacteria or viruses, which have large social impacts, such as influenza viruses, avian influenza viruses, MERS viruses, Zika viruses, and foot-and-mouth diseases. Meanwhile, rapid diagnoses for these pathogens are required on site, and to this end, integrated genetic analysis devices using a microchip have recently been developed. These devices are called a lab on a chip that means a laboratory environment implemented on a single chip.

Various pathogens may be diagnosed directly on site by an on-site diagnosis device, and thus the pathogens can be blocked in advance, thereby reducing damage of human lives and economic loss. Further, it is determined that the genetic diagnoses, which are currently performed only in university hospitals, can be quickly made on site at small local hospitals and public health centers.

However, the rotational genetic diagnosis devices according to the related art have the following problems. First, a sample loading unit is located radially inward from a bead channel, a time for a deoxyribonucleic acid (DNA)/a ribonucleic acid (RNA) to be adsorbed onto a bead is not sufficient, and accordingly, a sample pretreatment efficiency is somewhat reduced. Second, large-capacity diagnoses are difficult because a sufficient amount of sample solution cannot be contained in a chamber containing waste liquid. The above-described problems cause a decrease in the efficiency of the genetic diagnoses, and the need for genetic diagnosis devices that solve these problems is increasing.

SUMMARY OF THE INVENTION

The present disclosure is directed to providing a rotational genetic diagnosis device that may exhibit further improved sample pretreatment efficiency and simultaneously perform diagnosis of several viruses.

A genetic diagnosis chip according to an embodiment of the present disclosure includes one or more unit processing parts, wherein the unit processing part includes a pretreatment unit that loads a sample and performs a pretreatment process on a target material in the loaded sample, and a distribution unit which is located radially outward from the pretreatment unit and in which the target material pretreated through the pretreatment unit is distributed and detection of the distributed target material is performed, wherein the pretreatment unit includes a sample loading unit that loads the sample, and a capture channel which captures the target material from the loaded sample, and the sample loading unit is formed on the capture channel.

The pretreatment unit may further include a washing liquid storage unit which is located radially inward from the capture channel to communicate with the capture channel and in which a washing liquid for washing materials excluding the target material captured in the capture channel is stored, and an eluent storage unit which is located radially inward from the capture channel to communicate with the capture channel and in which an eluent for separating the target material captured in the capture channel is stored.

The pretreatment unit may further include a delay unit provided between the capture channel and the washing liquid storage unit and configured to delay passage of the washing liquid so that the washing liquid reaches the capture channel later than the sample.

The delay unit may include a delay chamber in which the washing liquid that is headed toward the capture channel from the washing liquid storage unit is stored, and a delay channel which is provided between the delay chamber and the capture channel and allows the washing liquid stored in the delay chamber to be discharged to the capture channel when an amount of the washing liquid is greater than or equal to a predetermined amount.

The unit processing part may further include a cocktail storage unit which is located radially outward from the eluent storage unit and in which a cocktail is stored, a connection chamber which is located radially outward from the capture channel and the cocktail storage unit and communicates with an outlet of the capture channel and the cocktail storage unit, and a collection chamber which is located radially outward from the connection chamber and communicates with the connection chamber and in which the eluent containing the pretreated target material and the cocktail are stored and mixed.

The distribution unit may include an input channel which communicates with the collection chamber and distributes a mixture in which the eluent including the pretreated target material and the cocktail are mixed, and one or more reaction chambers that accommodate the mixture distributed through the input channel and in which a polymerase chain reaction (PCR) or a reverse Transcription PCR (RT-PCR) is performed on the distributed mixture, and the one or more reaction chambers may store primers for detecting the target material contained in the distributed mixture.

The distribution unit may further include one or more connection channels for connecting one or more outlets formed radially outside the input channel and the one or more reaction chambers.

The unit processing part may further include a waste liquid chamber which is located radially outward from the connection chamber to communicate with the connection chamber and in which the sample and the washing liquid passing through the capture channel are stored.

A superabsorbent polymer that absorbs the sample passing through the capture channel may be attached to an inside of the waste liquid chamber.

An injection hole for injecting a solution may be formed in each of the washing liquid storage unit, the eluent storage unit, and the cocktail storage unit.

The unit processing part may further include an oil loading unit which is located radially inward from the distribution unit to communicate with the input channel and loads an oil input to the input channel to prevent evaporation of the mixture after the mixture is distributed.

The oil may be input into the input channel when external heat having a predetermined temperature or higher is applied.

A genetic diagnosis chip according to another embodiment of the present disclosure includes one or more unit processing parts, wherein the unit processing part includes a pretreatment unit that loads a sample and performs a pretreatment process on a target material in the loaded sample, a distribution unit which is located radially outward from the pretreatment unit, includes an input channel configured to distribute a mixture in which an eluent containing the target material pretreated through the pretreatment unit and a cocktail are mixed, and includes one or more reaction chambers in which a polymerase chain reaction (PCR) or a reverse Transcription PCR (RT-PCR) is performed on the distributed mixture, and an oil chamber which is located radially inward from the input channel to communicate with the input channel and in which an oil input to the input channel to prevent evaporation of the mixture after the mixture is distributed is stored.

The genetic diagnosis chip may further include a sealing part which is provided in a portion in which the oil chamber and the input channel communicate with each other, blocks the oil from being introduced into the input channel, and allows the oil to be input to the input channel when external heat having a predetermined temperature or higher is applied.

A cartridge mounted on a genetic diagnosis chip according to an embodiment of the present disclosure includes at least one injection hole which is inserted into any one of a sample loading unit, a washing liquid storage unit, an eluent storage unit, and a cocktail storage unit of the genetic diagnosis chip and through which a corresponding solution is injected.

The cartridge may further include at least one solution storage unit that communicates with the at least one injection hole and stores the corresponding solution.

The at least one injection hole may communicate with the at least one solution storage unit at a position farthest from a rotary shaft of the genetic diagnosis chip so that, when the genetic diagnosis chip rotates, the corresponding solution is injected into the genetic diagnosis chip through the at least one injection hole.

The at least one solution storage unit may include a first solution storage unit which has a first injection hole inserted into the sample loading unit and in which a sample is stored, and a second solution storage unit which has a second injection hole inserted into the washing liquid storage unit and in which a washing liquid is stored, and the second solution storage unit has a passive valve formed therein so that the washing liquid does not leak into the genetic diagnosis chip due to a pressure when the cartridge is mounted on the genetic diagnosis chip.

The at least one solution storage unit may include a third solution storage unit which has a third injection hole inserted into the eluent storage unit and in which an eluent is stored, and a fourth solution storage unit which has a fourth injection hole inserted into the cocktail storage unit and in which a cocktail is stored.

In the second solution storage unit, one sidewall of a lower space formed between the passive valve and the second injection hole may be inclined by a predetermined angle with respect to the rotary shaft, and in the third solution storage unit, a space corresponding to the lower space of the second solution storage unit may be formed to face the one sidewall of the lower space with respect to the rotary shaft.

The cartridge may further include a fifth injection hole which is inserted into an oil loading unit of the genetic diagnosis chip and through which the corresponding solution is injected, wherein the at least one solution storage unit further includes a fifth solution storage unit which has the fifth injection hole inserted into the oil loading unit and in which an oil is stored.

The fifth injection hole may have a sealing part that blocks input of the oil, and the sealing part may allow the oil to be input to the oil loading unit when heat having a predetermined temperature or higher is applied.

The cartridge may be manufactured using a three-dimensional (3D) printing method.

The cartridge may be manufactured of a disposable plastic material.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 10A to 10L are views for describing a process of detecting a target material using the genetic diagnosis chip according to the embodiment of the present disclosure.

DETAILED DESCRIPTION OF EXEMPLARY EMBODIMENTS

Figure 1:
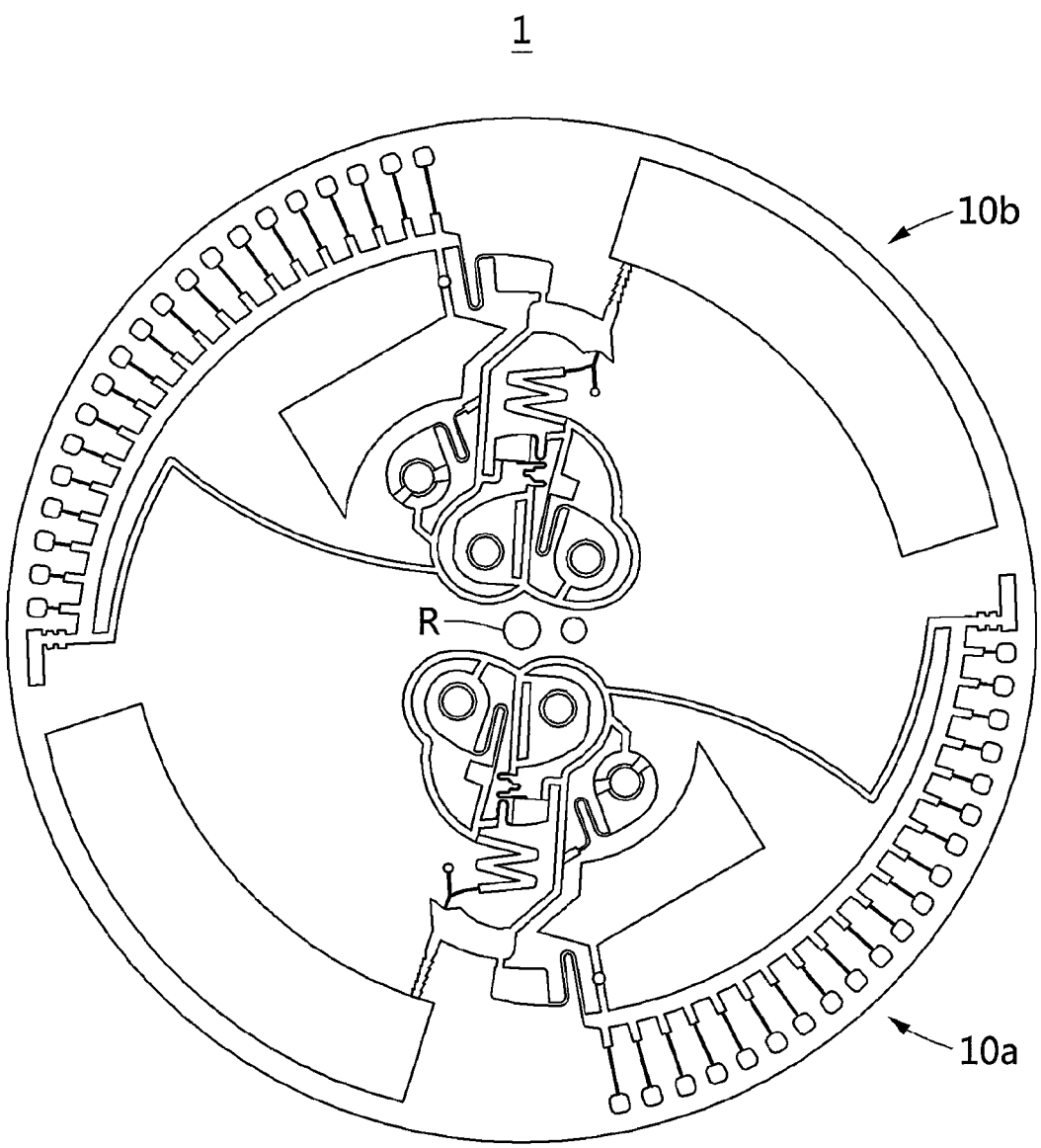
FIG. 1 is a view illustrating a genetic diagnosis chip according to an embodiment of the present disclosure.

Specific structural or functional descriptions of embodiments according to the concept of the present disclosure disclosed in the present specification are merely exemplified for describing the embodiments according to the concept of the present disclosure, and the embodiments according to the concept of the present disclosure may be implemented in various forms and are not limited to the embodiments described in the present specification.

Since the embodiments according to the concept of the present disclosure may be variously changed and may have various forms, the embodiments will be illustrated in the accompanying drawings and described in detail in the present specification. However, the embodiments according to the concept of the present disclosure are not intended to be limited to specific disclosed forms and include changes, equivalents, and substitutes included in the spirit and scope of the present disclosure.

Terms such as first and second may be used for describing various components, but the components should not be limited to the terms. The terms are used only for distinguishing a first component from a second component. For example, without departing from the scope of rights according to the concept of the present disclosure, the first component may be named the second component, and similarly, the second component may be named the first component.

It should be understood that, when it is referenced that a component is "connected" or "coupled" to another component, the component may be directly connected or coupled to another component or still another component may be present between the component and another component. On the other hand, it should be understood that, when a component is "directly connected" or "directly coupled" another component, still another component is not present therebetween. Expressions describing relationships between components, for example, "between," "directly between," "directly adjacent to," and the like should be interpreted similarly.

Terms used herein are used only for describing specific embodiments and are not intended to limit the present disclosure. Singular expressions include plural expressions unless clearly otherwise indicated in the context. It should be understood that terms such as "include" or "have" herein are intended to indicate that there are features, numbers, steps, operations, components, parts, or combinations thereof that are implemented, and do not exclude, in advance, the possibility of the presence or addition of one or more other features, numbers, steps, operations, components, components, or combinations thereof.

Unless otherwise defined, all terms used herein including technical or scientific terms have the same meanings as those commonly understood by those skilled in the art to which the present disclosure belongs. Terms defined in commonly used dictionaries should be interpreted as having the same meanings in the context of the related art and may not be interpreted with ideal or excessively formal meanings, unless explicitly defined in the present specification. Hereinafter, the embodiments will be described in detail with reference to the accompanying drawings.

A genetic diagnosis chip according to an embodiment of the present disclosure may detect a target material by a polymerase chain reaction (PCR) or a reverse Transcription PCR (RT-PCR) depending on a detection target material. Hereinafter, the embodiments will be described in detail.

1. Genetic Diagnosis Chip According to First Embodiment

FIG. 1 is a view illustrating a genetic diagnosis chip according to an embodiment of the present disclosure.

Referring to FIG. 1, a genetic diagnosis chip 1 according to the embodiment of the present disclosure is configured so that a cartridge which will be described below may be mounted thereon and may have a disc shape. A through-hole R is formed in the center of the genetic diagnosis chip 1, and the through-hole R is a part corresponding to a rotary shaft when the genetic diagnosis chip 1 rotates while being mounted on a genetic diagnosis device.

The genetic diagnosis chip 1 includes one or more unit processing parts 10a and 10b arranged in a circumferential direction with respect to the rotary shaft. Two or more unit processing parts 10a and 10b may be included in consideration of the shape or size of the genetic diagnosis chip 1 and the unit processing parts 10a and 10b. However, hereinafter, it will be described that the genetic diagnosis chip 1 includes two unit processing parts 10a and 10b.

The unit processing parts 10a and 10b included in the genetic diagnosis chip 1 are made of a polymethyl methacrylate (PMMA) material. The unit processing parts 10a and 10b may be manufactured such that one surface of the disc-shaped genetic diagnosis chip 1 having a predetermined thickness is processed into a groove shape using a CNC milling machine to form a pattern, and the formed pattern is bonded using a pressure sensitive adhesive (PSA) foil. However, the present disclosure is not limited to this embodiment. Hereinafter, the unit processing parts 10a and 10b will be described in more detail with reference to FIG. 2.

Figure 2:
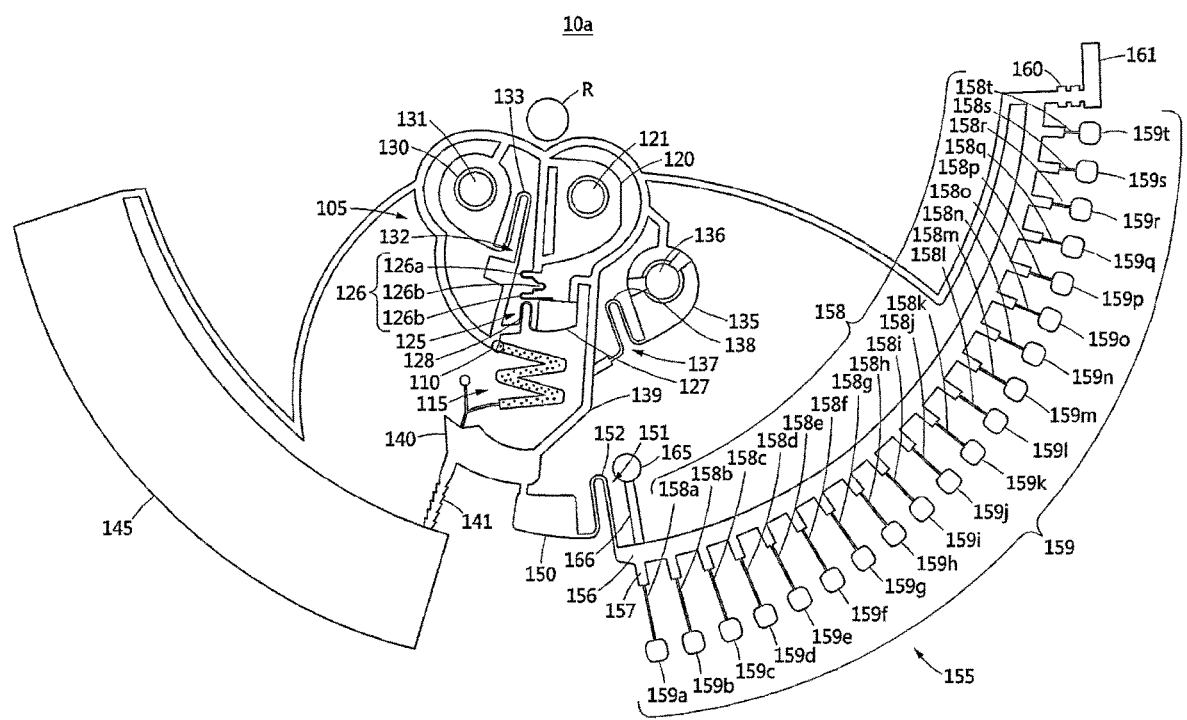
FIG. 2 is a view illustrating a unit processing part included in the genetic diagnosis chip illustrated in FIG. 1.

FIG. 2 is a view illustrating a unit processing part included in the genetic diagnosis chip illustrated in FIG. 1.

Referring to FIG. 2, the unit processing part 10a according to the embodiment of the present disclosure includes a sample loading unit 110, a capture channel 115, a washing liquid storage unit 120, a delay unit 125, an eluent storage unit 130, a cocktail storage unit 135, a connection chamber 140, a waste liquid chamber 145, a collection chamber 150, a distribution unit 155, and an oil loading unit 165. Here, the sample loading unit 110, the capture channel 115, the washing liquid storage unit 120, the delay unit 125, and the eluent storage unit 130 constitute a pretreatment unit 105 that performs a pretreatment process.

The pretreatment unit 105 loads a sample from the cartridge and performs the pretreatment process on a target material in the loaded sample. Here, the pretreatment may include, for example, a process of capturing, washing, and separating the loaded sample. By separating only the target material from the sample by the pretreatment of the loaded sample, the target material may be detected later by a gene amplification process.

In order to perform the above-described pretreatment process, the pretreatment unit 105 includes the sample loading unit 110, the capture channel 115, the washing liquid storage unit 120, the delay unit 125, and the eluent storage unit 130.

The sample loading unit 110 loads the sample stored in the cartridge when the cartridge is mounted on the unit processing part 10a. In more detail, the sample loading unit 110 is formed on the capture channel 115, which will be described below, and directly loads the sample stored in the cartridge onto the capture channel 115. In a genetic diagnosis chip according to a related art, the sample stored in a separate sample storage unit located radially inward from the capture channel 115 passes through the capture channel 115 by a centrifugal force. However, in the case of the present disclosure, since the sample may be directly loaded on the capture channel 115 by the sample loading unit 110, a time for the target material to be adsorbed onto the bead of the capture channel 115 can increase, and accordingly, the sample pretreatment efficiency can also increase. Here, the sample loading unit 110 may be formed anywhere on the capture channel 115 and may preferably be formed in an inlet of the capture channel 115 or between the inlet and an outlet of the capture channel 115.

Meanwhile, when the genetic diagnosis chip 1 is rotated, the loaded sample passes through the capture channel 115 and flows into the waste liquid chamber 145, which will be described below, due to the centrifugal force.

The capture channel 115 captures the target material from the sample loaded through the sample loading unit 110. The inlet and the outlet are provided at both ends of the capture channel 115. Here, the inlet of the capture channel 115 communicates with the washing liquid storage unit 120 and the eluent storage unit 130 located radially inward from the capture channel 115, and the outlet of the capture channel 115 communicates with the connection chamber 140 located radially outward from the capture channel 115. Thus, as the genetic diagnosis chip 1 rotates, a washing liquid or an eluent may flow into the connection chamber 140 through the capture channel 115.

The capture channel 115 may have a zigzag shape to maximize a time for the target material to be adsorbed onto the bead, but the present disclosure is not limited thereto.

Figure 3:
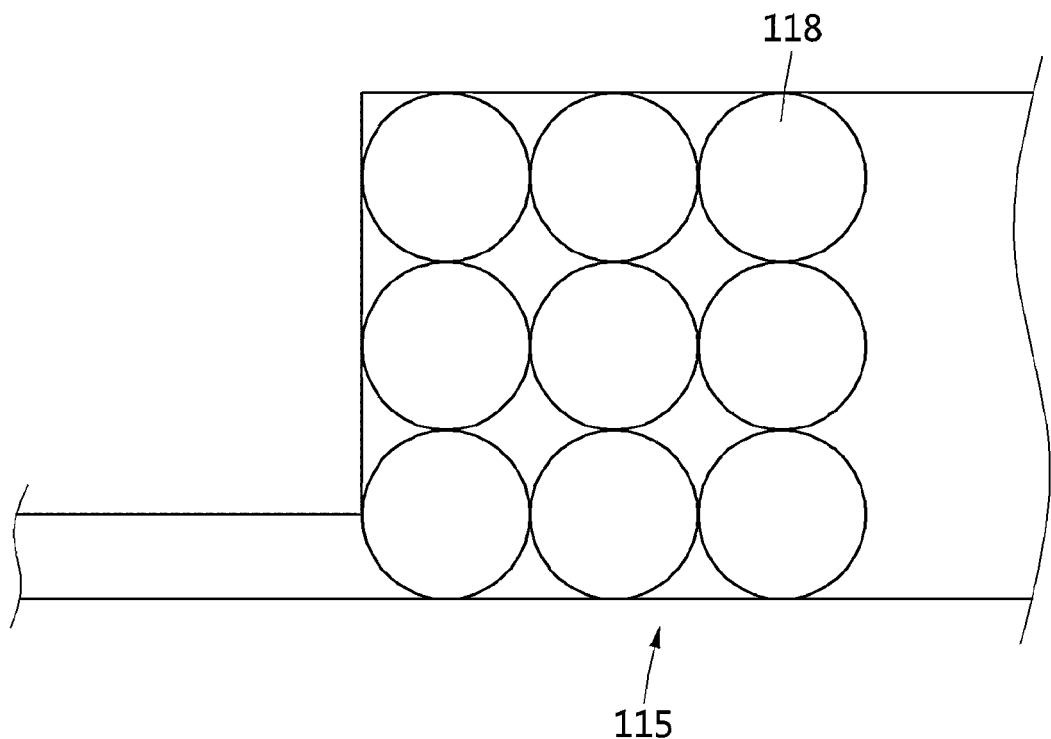
FIG. 3 is a cross-sectional view illustrating a capture channel included in the unit processing part.

Referring to FIG. 3 illustrating a cross section of the capture channel 115 included in the unit processing part 10a, a capture unit 118, such as a silica bead, is provided inside the capture channel 115, and thus the target material, such as a deoxyribonucleic acid (DNA) or a ribonucleic acid (RNA), is captured from the loaded sample by the capture unit 118. Here, the capture unit 118 provided inside the capture channel 115 may be formed to be greater than the width of the outlet and may thus be prevented from being separated from the capture channel 115.

The washing liquid storage unit 120 has a chamber shape and stores, in the interior thereof, the washing liquid for washing the remaining materials excluding the target material captured in the capture channel 115. In more detail, the washing liquid storage unit 120 is located radially inward from the capture channel 115 and is connected to the inlet of the capture channel 115. Thus, as the genetic diagnosis chip 1 rotates, the washing liquid stored in the washing liquid storage unit 120 flows to the capture channel 115 and thus may wash the remaining materials excluding the target material captured in the capture channel 115.

Meanwhile, the washing liquid storage unit 120 is formed with a washing liquid injection hole 121 for injecting the washing liquid from the cartridge. After the washing liquid is injected into the washing liquid storage unit 120 through the washing liquid injection hole 121, the washing liquid injection hole 121 is sealed when the cartridge is mounted.

The delay unit 125 may be provided between the washing liquid storage unit 120 and the capture channel 115. The delay unit 125 is configured to delay the passage of the washing liquid so that the washing liquid discharged from the washing liquid storage unit 120 reaches the capture channel 115 later than the sample. To this end, the delay unit 125 includes an inflow channel 126, a delay chamber 127, and a delay channel 128.

The inflow channel 126 connects the washing liquid storage unit 120 and the delay chamber 127 to allow the washing liquid stored in the washing liquid storage unit 120 to be introduced into the delay chamber 127. The inflow channel 126 may include a first washing liquid diversion curved part 126a, a second washing liquid diversion curved part 126b, and a third washing liquid diversion curve part 126c. In more detail, the first washing liquid diversion curved part 126a extends from the outlet of the washing liquid storage unit 120 and diverts the flow of the washing liquid discharged from the washing liquid storage unit 120 from a first circumferential direction to a second circumferential direction. The second washing liquid diversion curved part 126b is connected to the first washing liquid diversion curved part 126a and diverts the flow of the washing liquid from the second circumferential direction to the first circumferential direction. The third washing liquid diversion curved part 126c has one end connected to the second washing liquid diversion curved part 126b and the other end connected to the delay chamber 127 and diverts the flow of the washing liquid from the first circumferential direction to the second circumferential direction. Thus, the injection of the washing liquid discharged from the washing liquid storage unit 120 into the delay chamber 127 may be delayed.

Meanwhile, unlike the above description, the inflow channel 126 may include only one washing liquid diversion curved part that may convert the flow of the washing liquid from the first circumferential direction to the second circumferential direction.

The delay chamber 127 may store the washing liquid that is headed toward the capture channel 115 from the washing liquid storage unit 120. The delay chamber 127 has one end connected to the inflow channel 126 and the other end connected to the delay channel 128, stores the washing liquid coming from the inflow channel 126, and discharges the washing liquid to the delay channel 128.

The delay channel 128 is provided between the delay chamber 127 and the capture channel 115 to delay the passage of the washing liquid. To this end, the delay channel 128 includes a first delay path and a second delay path. The first delay path is connected to the delay chamber 127 and extends radially inward from the delay chamber 127. The second delay path is connected to the inlet of the capture channel 115, extends radially outward from the first delay path, and is connected to the inlet of the capture channel 115.

The delay channel 128 allows the washing liquid stored in the delay chamber 127 to be discharged to the capture channel 115 when the amount of the washing liquid is greater than or equal to a preset amount. Here, the preset amount is an amount when the height of the washing liquid stored in the delay chamber 127 coincides with the length of the first delay path. In this case, since a capillary force is greater than a centrifugal force generated by rotating the genetic diagnosis chip, the washing liquid may pass through the first delay path and flow into the second delay path. That is, since the washing liquid does not flow into the capture channel 115 until the washing liquid reaches the preset amount in the delay chamber 127, the washing liquid reaches the capture channel 115 later than the washing liquid. Thus, a phenomenon may be prevented in which the washing liquid flows into the capture channel 115 even before the target material is captured by the capture channel 115.

The eluent storage unit 130 is in the form of a chamber and stores the eluent for separating the target material captured in the capture channel 115. In more detail, the eluent storage unit 130 is located radially inward from the capture channel 115 and communicates with the capture channel 115. Thus, as the genetic diagnosis chip 1 rotates, the eluent stored in the eluent storage unit 130 flows to the capture channel 115 and thus may separate, from the capture unit 118, the target material captured in the capture channel 115.

Meanwhile, the eluent storage unit 130 is formed with an eluent injection hole 131 for injecting the eluent from the cartridge. After the eluent is injected into the eluent storage unit 130 through the eluent injection hole 131, the eluent injection hole 131 is sealed when the cartridge is mounted.

The eluent storage unit 130 is connected to the capture channel 115 by an eluent introduction channel 132. That is, the eluent introduction channel 132 has one end connected to an outlet of the eluent storage unit 130 and the other end connected to the inlet of the capture channel 115.

The eluent introduction channel 132 has an eluent diversion curved part 133. In more detail, the eluent diversion curved part 133 diverts the flow of the eluent discharged from the eluent storage unit 130 from the inside to the outside in the radial direction. By providing the eluent diversion curved part 133, the eluent may not flow into the capture channel 115 when the genetic diagnosis chip 1 rotates and may flow into the capture channel 115 when the genetic diagnosis chip 1 is stopped. Thus, both the sample and the washing liquid flow into the capture channel 115, and then the eluent may flow into the capture channel 115.

The cocktail storage unit 135 is located radially outward from the eluent storage unit 130 in the form of a chamber and stores a cocktail in the interior thereof. Here, the cocktail may include substances necessary for the PCR or the RT-PCR, such as a gene amplification enzyme (for example, a DNA polymerase) or an indicator (for example, an eriochrome black T (EBT) indicator).

Meanwhile, the cocktail storage unit 135 is formed with a cocktail injection hole 136 for injecting the cocktail from the cartridge. After the cocktail is injected into the cocktail storage unit 135 through the cocktail injection hole 136, the cocktail injection hole 136 is sealed when the cartridge is mounted.

The cocktail storage unit 135 is connected to a first connection channel 139 by a cocktail introduction channel 137. That is, the eluent introduction channel 132 has one end connected to an outlet of the cocktail storage unit 135 and the other end connected to an inlet of the first connection channel 139, and thus the cocktail flows to the connection chamber 140.

The cocktail introduction channel 137 has a cocktail diversion curved part 138. In more detail, the cocktail diversion curved part 138 diverts the flow of the cocktail discharged from the cocktail storage unit 135 from the inside to the outside in the radial direction. By providing the cocktail diversion curved part 138, the cocktail may not flow into the connection chamber 140 when the genetic diagnosis chip 1 rotates and may flow into the connection chamber 140 when the genetic diagnosis chip 1 is stopped. Thus, both the sample and the washing liquid flow into the capture channel 115, and then the cocktail may flow into the connection chamber 140.

The first connection channel 139 connected to an outlet of the cocktail introduction channel 137 is connected to the connection chamber 140 located radially outward from the cocktail introduction channel 137 and allows the cocktail passing through the cocktail introduction channel 137 to flow into the connection chamber 140.

The connection chamber 140 is located radially outward from the capture channel 115 and the cocktail storage unit 135 in the form of a chamber and communicates with the outlet of the capture channel 115 and the cocktail storage unit 135. In more detail, the outlet of the capture channel 115 and the cocktail storage unit 135 communicate with one end and the other end of one surface located radially inward from the connection chamber 140. Further, the waste liquid chamber 145 and the collection chamber 150 respectively communicate with one end and the other end of the other surface located radially outside the connection chamber 140. Thus, the sample and the washing liquid passing through the capture channel 115 flow to the waste liquid chamber 145, and the eluent passing through the capture channel 115 and the cocktail passing through the first connection channel 139 flow to the collection chamber 150.

The connection chamber 140 is connected to the waste liquid chamber 145 by a second connection channel 141. Meanwhile, the second connection channel 141 may be provided with one or more capillary valves. The capillary valves may prevent a solution stored in the waste liquid chamber 145 from being discharged to the outside again through the second connection channel 141.

The waste liquid chamber 145 is in the form of a chamber and stores the sample and the washing liquid passing through the capture channel 115. In more detail, the waste liquid chamber 145 may be located radially outward from the connection chamber 140, may communicate with the connection chamber 140, and may be formed in consideration of the sample storage unit and the washing liquid storage unit 120 to store unnecessary substances except for the target material. Meanwhile, a superabsorbent polymer, which absorbs the sample passing through the capture channel 115, may be attached to the inside of the waste liquid chamber 145. The superabsorbent polymer, which is a polymer having a three-dimensional (3D) network structure through cross-linking between polymer chains, has a much higher absorption capacity for solutions compared to a general polymer. By attaching double-sided tape to the inside of the waste liquid chamber 145 and spraying the superabsorbent polymer onto the attached double-sided tape, the superabsorbent polymer may be attached to the waste liquid chamber 145. When such a superabsorbent polymer is attached to the waste liquid chamber 145, the unit processing part 10a may detect the target material for a larger-capacity sample.

Figure 4:
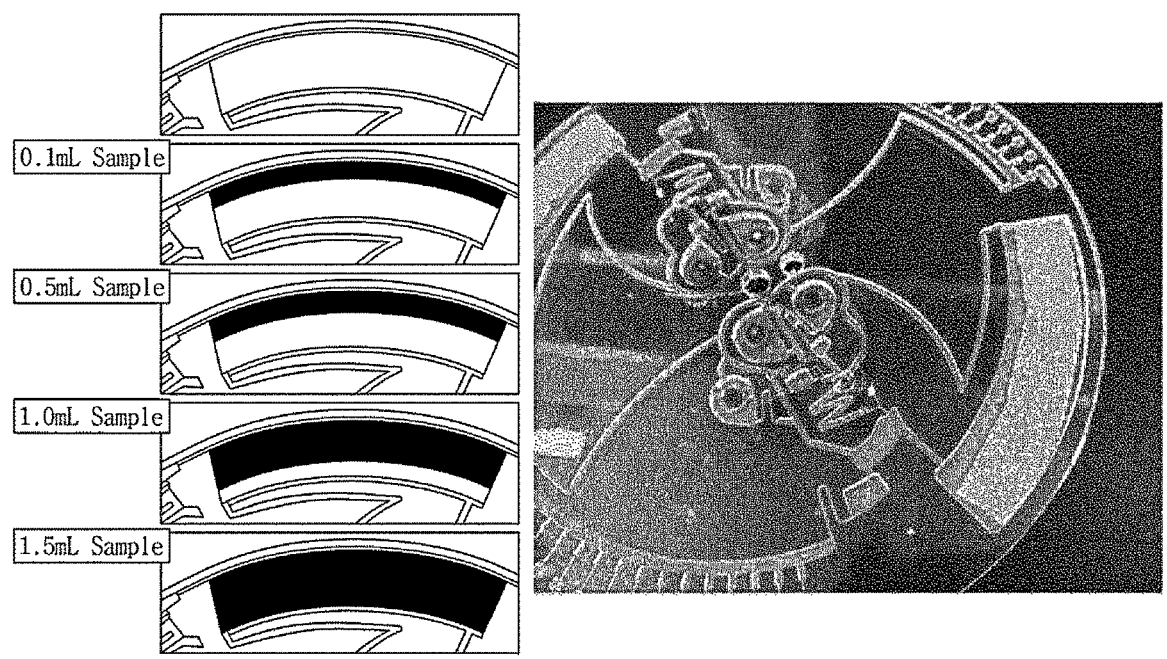
FIG. 4 is a view illustrating an absorption power of a superabsorbent polymer attached to a waste liquid chamber according to a sample capacity.

Referring to FIG. 4 illustrating the absorption power of the superabsorbent polymer attached to the waste liquid chamber according to a sample capacity, it can be identified that the sample and the washing liquid injected into the waste liquid chamber 145 and passing through the capture channel 115 are absorbed into the superabsorbent polymer, and the absorbed part is yellow, and it can be identified that, even when 1.5 mL of a large-capacity sample is injected into the waste liquid chamber 145, the sample may be absorbed without leaking into the connection chamber 140.

The collection chamber 150 is in the form of a chamber, and the eluent and the cocktail containing the target material pretreated through the pretreatment unit 105 are stored and mixed in the collection chamber 150. In more detail, the collection chamber 150 is located radially outward from the connection chamber 140 to communicate with the connection chamber 140 and also communicates with the distribution unit 155 located radially outward from the collection chamber 150. The eluent and the cocktail stored in the collection chamber 150 are mixed in the collection chamber 150 when the genetic diagnosis chip repeatedly rotates or rotates in reverse (hereinafter, a solution, in which the eluent and the cocktail containing the pretreated target material are mixed, is called a mixture).

The collection chamber 150 is connected to the distribution unit 155 by a mixture introduction channel 151. The mixture introduction channel 151 has a mixture diversion curved part 152. In more detail, the mixture diversion curved part 152 diverts the flow of the mixture discharged from the collection chamber 150 from the inside to the outside in the radial direction. By providing the mixture diversion curved part 152, the mixture may not flow into the distribution unit 155 when the genetic diagnosis chip 1 rotates and may flow into the distribution unit 155 when the genetic diagnosis chip 1 is stopped.

The distribution unit 155 is located radially outward from the pretreatment unit 105, and in the distribution unit 155, the target material pre-treated through the pretreatment unit 105 is distributed, and the distributed target material is detected. To this end, the distribution unit 155 includes an input channel 156, third connection channels 158a to 158t, reaction chambers 159a to 159t, and a surplus mixture storage chamber 161.

The input channel 156 is connected to the collection chamber 150 by the mixture introduction channel 151 and distributes the mixture passing through the collection chamber 150 into one or more reaction chambers 159a to 159t which will be described below. To this end, the input channel 156 extends by a predetermined length in a circumferential direction and has an aliquoting structure. Here, the aliquoting structure is a structure in which one or more input outlets 157 extend from the radially outer side of the input channel 156. When the input channel 156 has the aliquoting structure, the mixture discharged from the collection chamber 150 is sequentially introduced into the one or more input outlets 157 formed in the input channel 156 in a direction in which the input channel 156 extends.

Meanwhile, the one or more input outlets 157 formed in the input channel 156 are connected to the one or more reaction chambers 159a to 159t located radially outward from the input channel 156 by the third connection channels 158a to 158t, respectively. The third connection channels 158a to 158t extend from the input outlets 157 formed in the input channel 156 to the reaction chambers 159a to 159t, respectively, and are formed to be narrower than the width of the input outlets 157 formed in the input channel 156. Further, the lengths of the third connection channels 158a to 158t may be formed to be shorter as the third connection channels 158a to 158t are located to be farther away from the collection chamber 150. This is to allow the mixture to flow into the reaction chambers 159a to 159t even with a reduced centrifugal force because the centrifugal force applied to the mixture is reduced in the circumferential direction. The mixture introduced into the input outlets 157 of the input channel 156 may be introduced into the reaction chambers 159a to 159t through the third connection channels 158a to 158t.

The reaction chambers 159a to 159t are in the form of a chamber, are located radially outward from the third connection channels 158a to 158t in the circumferential direction, and correspond to the one or more input outlets 157 formed in the input channel 156. In the reaction chambers 159a to 159t, the mixture distributed through the input channel 156 is accommodated, and the PCR or the RT-PCR is performed on the mixture distributed according to the target material. Different primers are stored in the one or more reaction chambers 159a to 159t in order to detect the target material included in the distributed mixture. Further, the primers may not be stored. After the target material included in the mixture distributed in the reaction chambers 159a to 159t is amplified by the PCR or RT-PCR, colorimetric detection of the indicator according to whether the target material reacts with the primer is performed, and thus the target material may be detected. Further, the target material may be detected by a fluorescence detection method through a separate detector (not illustrated).

The surplus mixture storage chamber 161 is in the form of a chamber and stores a surplus mixture not accommodated in the reaction chambers 159a to 159t. In more detail, the surplus mixture storage chamber 161 is located on the farthest side in the circumferential direction from a point at which the input channel 156 and the collection chamber 150 are connected and is located radially outward from the input channel 156. The surplus mixture storage chamber 161 is connected to an end of the input channel 156 by a fourth connection channel 160. Meanwhile, the fourth connection channel 160 may be provided with one or more capillary valves. The capillary valves may prevent the surplus mixture stored in the surplus mixture storage chamber 161 from being discharged to the outside again through the fourth connection channel 160.

The oil loading unit 165 is located radially inward from the distribution unit 155 and connected to the input channel 156 through an oil introduction channel 166. The oil loading unit 165 loads, from the cartridge which will be described below, oil introduced into the input channel 156 in order to prevent evaporation of the mixture after the mixture is distributed. That is, after the cartridge is mounted on the genetic diagnosis chip 1, the oil stored in the cartridge is loaded and sent to the input channel 156. An injection hole of the cartridge mounted on the oil loading unit 165 is sealed through a sealing part, and after the mixture is introduced into the reaction chambers 159a to 159t, when external heat having a predetermined temperature or higher is applied, the oil is introduced into the input channel 156. A detailed description thereof will be described below.

2. Genetic Diagnosis Chip According to Second Embodiment

Figure 5:
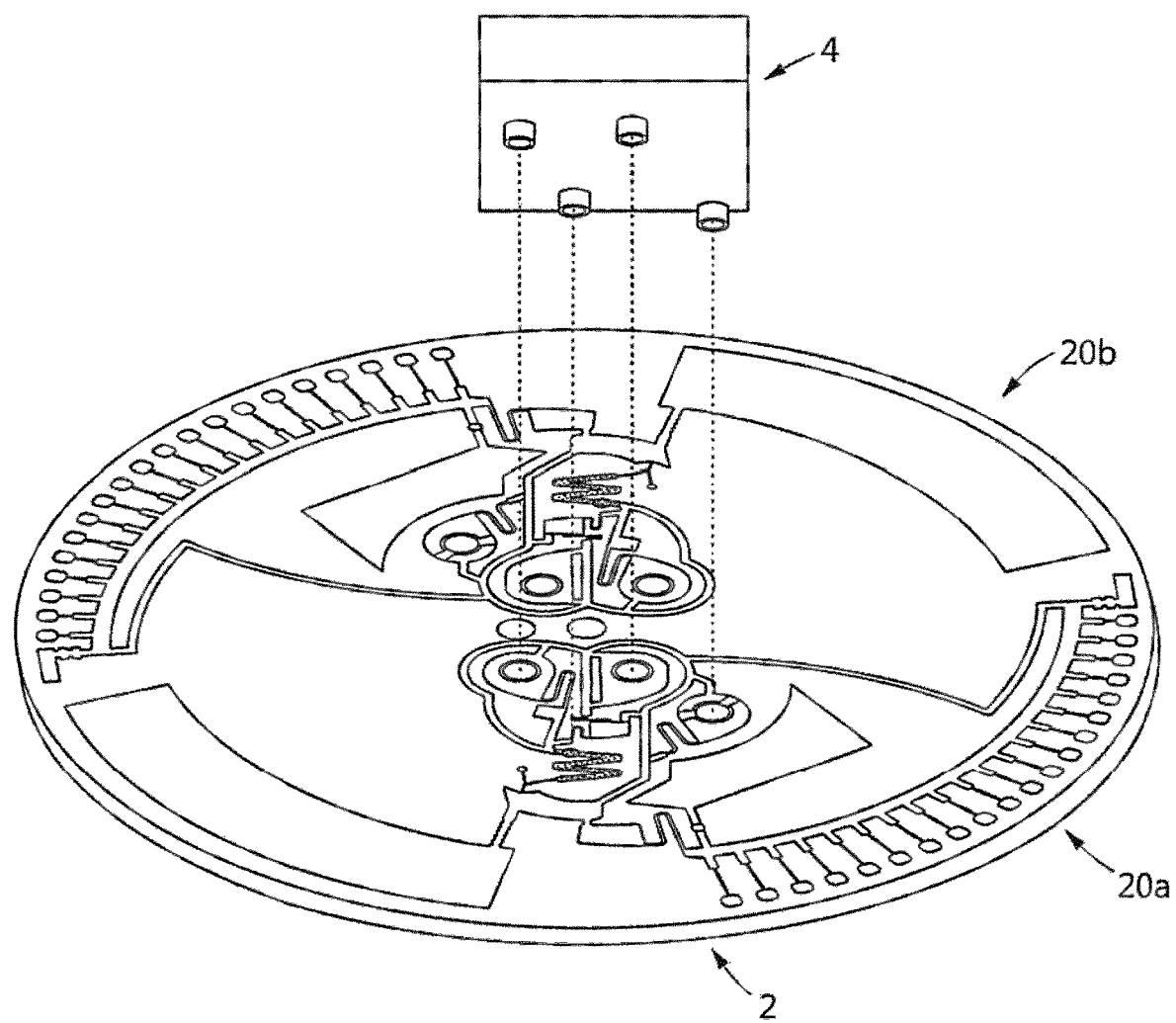
FIG. 5 is a view for describing a state in which the genetic diagnosis chip and a cartridge corresponding thereto are coupled according the embodiment of the present disclosure.
Figure 6:
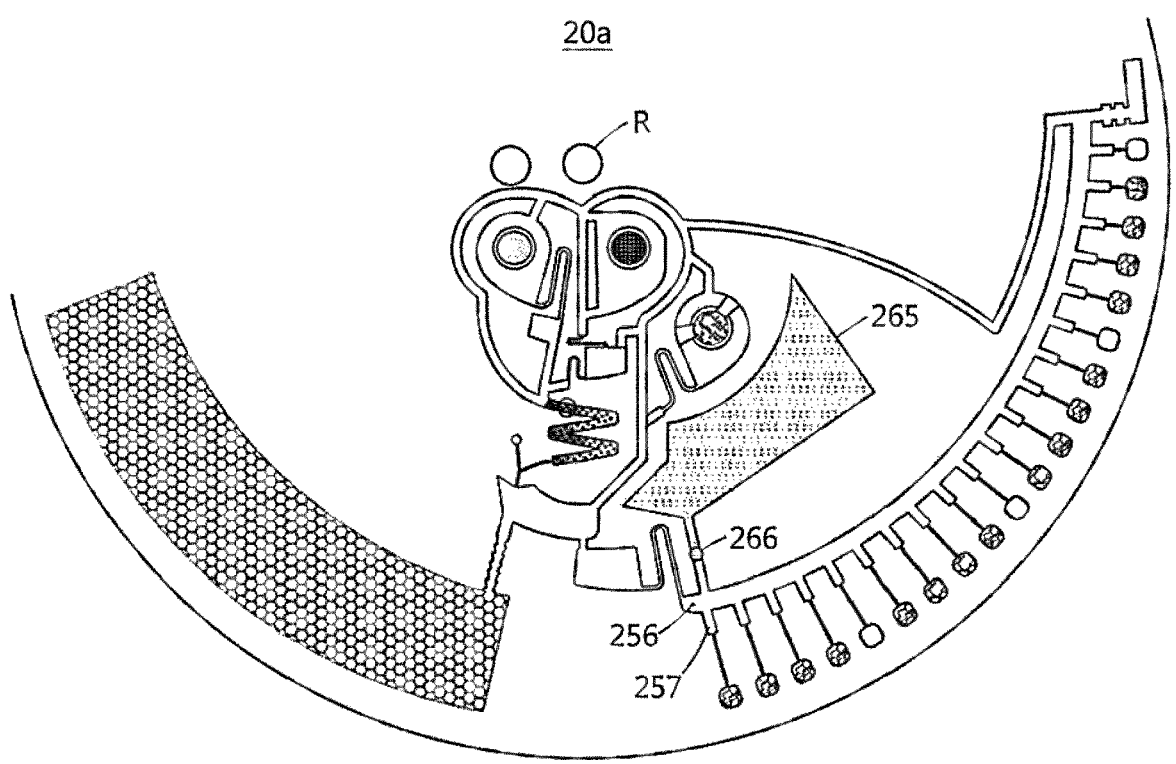
FIG. 6 is a view illustrating a unit processing part included in the genetic diagnosis chip illustrated in FIG. 5.

FIG. 5 is a view for describing a state in which the genetic diagnosis chip and a cartridge corresponding thereto are coupled according to another embodiment of the present disclosure, and FIG. 6 is a view illustrating a unit processing part included in the genetic diagnosis chip illustrated in FIG. 5.

Hereinafter, a detailed description of a configuration duplicated with the above-described genetic diagnosis chip according to the first embodiment will be omitted.

Referring to FIGS. 5 and 6, a genetic diagnosis chip 2 according to the second embodiment includes an oil chamber 265 instead of the oil loading unit, unlike the genetic diagnosis chip 1 according to the first embodiment. Thus, since it is not necessary to separately store the oil in a cartridge 4 mounted on the genetic diagnosis chip 2, a total of four injection holes may be formed in the cartridge 4.

The oil chamber 265 is in the form of a chamber and stores the oil input to an input channel 256 in order to prevent the evaporation of the mixture after the mixture is distributed into the input channel 256 and an input outlet 257. The oil chamber 265 is located radially inward from the input channel 256 to communicate with the input channel 256, and a sealing part 266 is provided in a portion in which the oil chamber 265 and the input channel 256 communicate with each other.

The sealing part 266 ordinarily prevents the oil stored in the oil chamber 265 from flowing into the input channel 256 and is formed so that when the external heat having a predetermined temperature or higher is applied, the oil is introduced into the input channel 256. The sealing part 266 may be formed of, for example, paraffin wax, but the present disclosure is not limited thereto, and the sealing part 266 may be formed of any material that is melted by the heat having a predetermined temperature or higher.

Each unit processing part of the genetic diagnosis chip including the above-described components is equipped with the cartridge to inject the stored solution into the cartridge. The cartridge may be mounted on the genetic diagnosis chip, may be configured to inject the solution into a mounted part through the injection holes, and may be manufactured through a 3D printing method. In this case, the material of the cartridge may be, for example, a disposable plastic material, but the present disclosure is not limited thereto. Meanwhile, since the genetic diagnosis chips according to the first and second embodiments of the present disclosure are somewhat different from each other, the cartridges are also configured according to the shape of the genetic diagnosis chips. Hereinafter, the cartridges according to the embodiments will be described with reference to FIGS. 7 and 8.

3. Cartridge of Genetic Diagnosis Chip According to First Embodiment

Figure 7A:
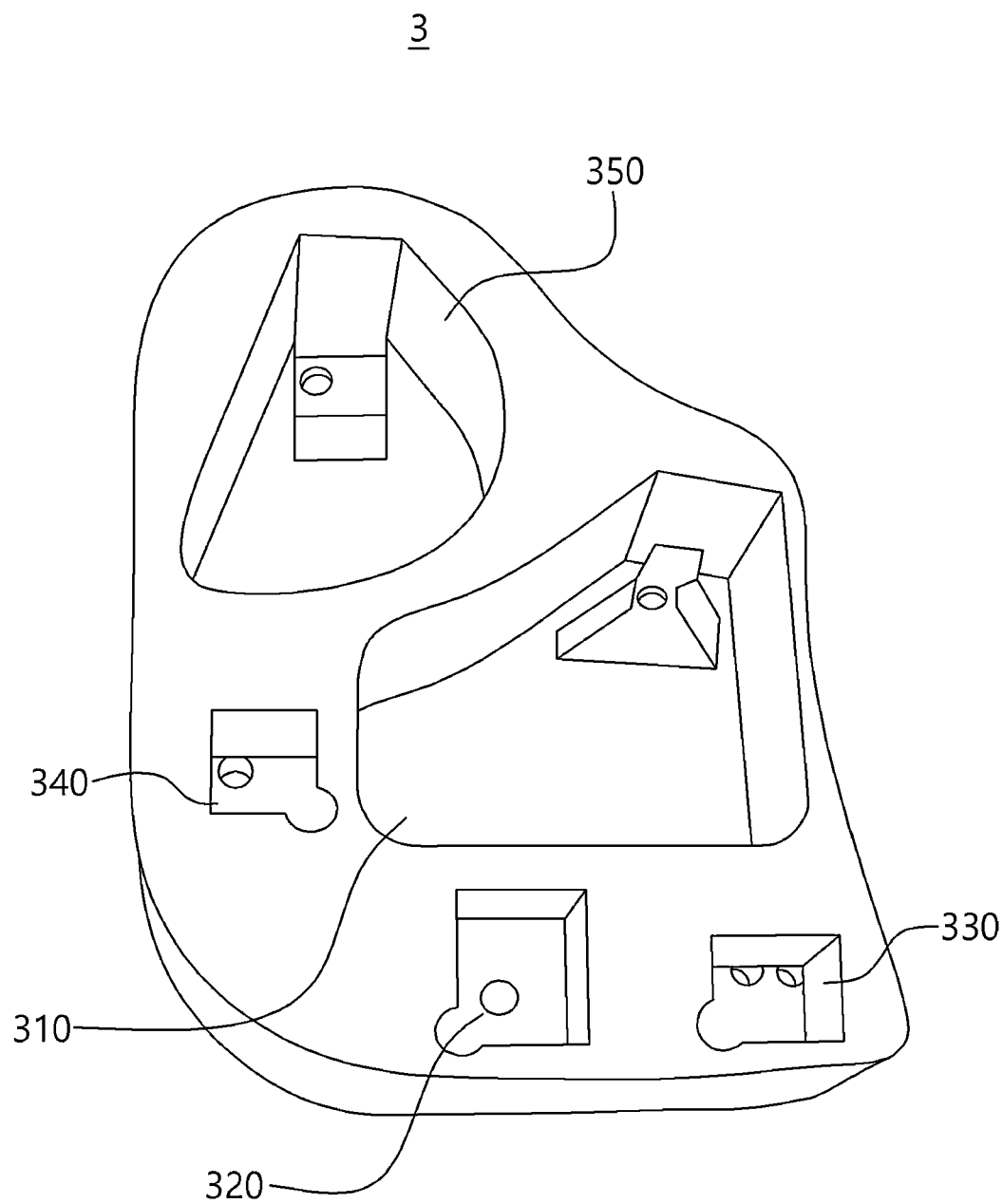
FIG. 7A is an internal view of a cartridge of the genetic diagnosis chip according to a first embodiment.
Figure 7B:
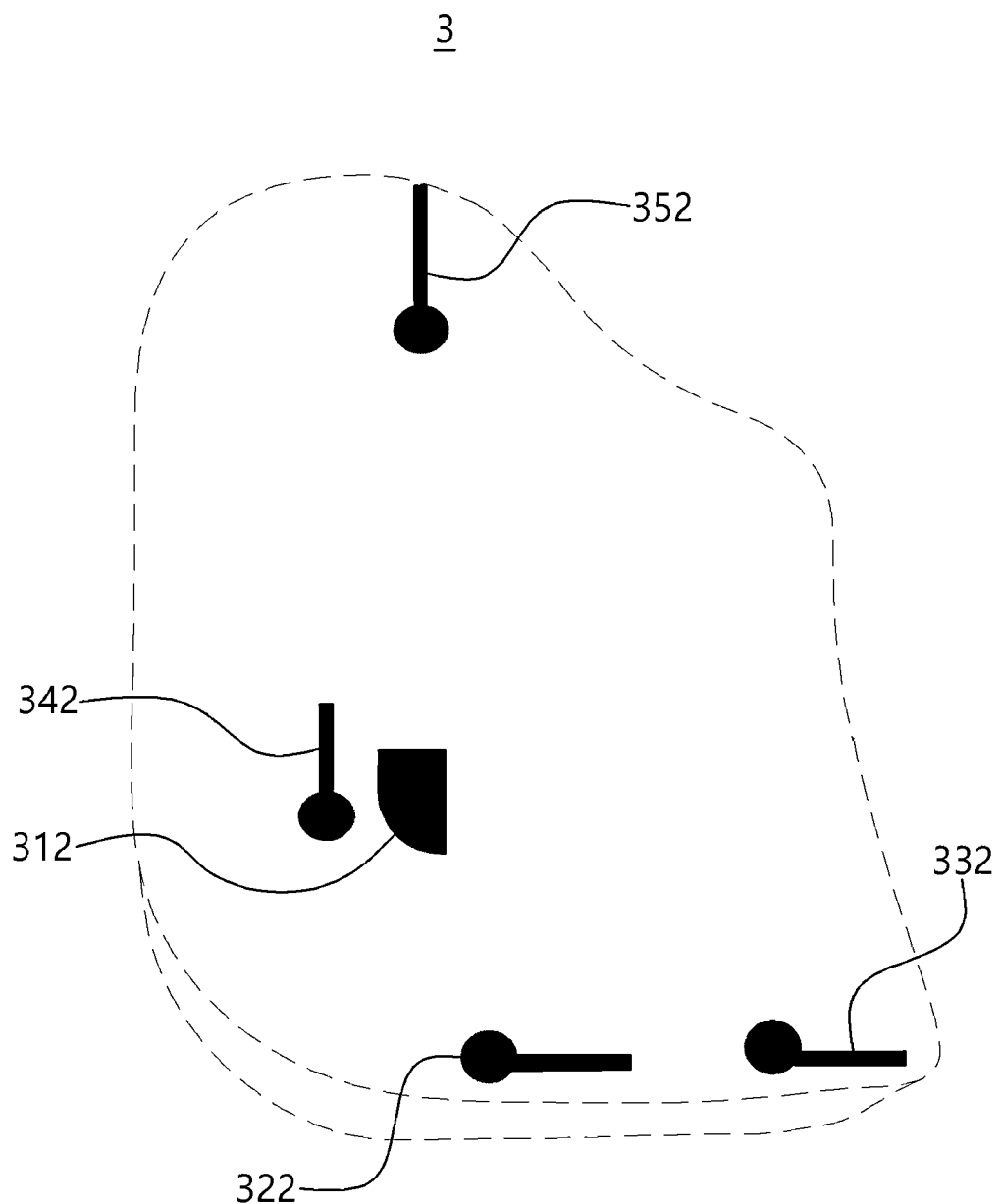
FIG. 7B is a bottom view of the cartridge of the genetic diagnosis chip according to the first embodiment.
Figure 7C:
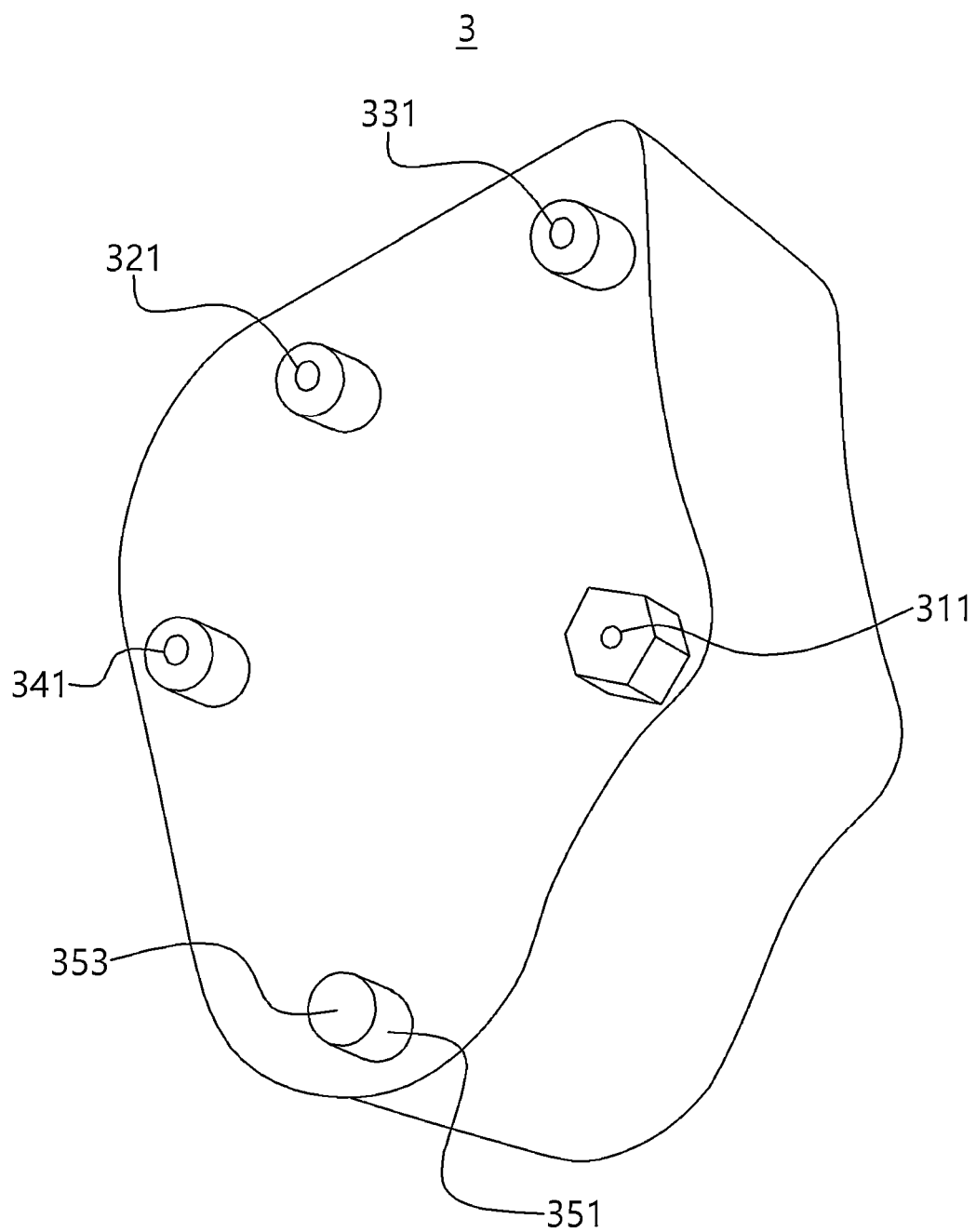
FIG. 7C is a plan view of the cartridge of the genetic diagnosis chip according to the first embodiment.

FIG. 7A is an internal view of a cartridge of the genetic diagnosis chip according to a first embodiment, FIG. 7B is a bottom view of the cartridge of the genetic diagnosis chip according to the first embodiment, and FIG. 7C is a plan view of the cartridge of the genetic diagnosis chip according to the first embodiment.

First, referring to FIGS. 7A and 7B, a cartridge 3 includes a first solution storage unit 310, a second solution storage unit 320, a third solution storage unit 330, a fourth solution storage unit 340, and a fifth solution storage unit 350 in the interior thereof. Each of the solution storage units communicates with one or more injection holes and stores a corresponding solution.

The first solution storage unit 310 is provided with a first injection hole 311 inserted into the sample loading unit 110 of the genetic diagnosis chip 1 and stores the sample containing the target material. Here, the first injection hole 311 protrudes from the bottom surface of the first solution storage unit 310 by a predetermined length to be mounted on a sample injection hole of the sample loading unit 110.

The second solution storage unit 320 is provided with a second injection hole 321 inserted into the washing liquid storage unit 120 of the genetic diagnosis chip 1 and stores the washing liquid. Here, the second injection hole 321 protrudes from the bottom surface of the second solution storage unit 320 by a predetermined length to be mounted on a washing liquid injection hole of the washing liquid storage unit 120.

Meanwhile, a 70% ethanol solution is mainly used as the washing liquid, but the ethanol leaks due to a pressure generated when the cartridge 3 is mounted on the genetic diagnosis chip 1. Accordingly, the second solution storage unit 320 may have a passive valve formed therein to prevent the leakage of the washing liquid. A detailed description thereof will be described below with reference to FIG. 8.

The third solution storage unit 330 is provided with a third injection hole 331 inserted into the eluent storage unit 130 of the genetic diagnosis chip 1 and stores the eluent. Here, the third injection hole 331 protrudes from the bottom surface of the third solution storage unit 330 by a predetermined length to be mounted on an eluent injection hole of the eluent storage unit 130.

The fourth solution storage unit 340 is provided with a fourth injection hole 341 inserted into the cocktail storage unit 135 of the genetic diagnosis chip 1 and stores the cocktail. Here, the fourth injection hole 341 protrudes from the bottom surface of the fourth solution storage unit 340 by a predetermined length to be mounted on a cocktail injection hole of the cocktail storage unit 135.

The fifth solution storage unit 350 is provided with a fifth injection hole 351 inserted into the oil loading unit 165 of the genetic diagnosis chip 1 and stores the oil. Here, the fifth injection hole 351 protrudes from the bottom surface of the fifth solution storage unit 350 by a predetermined length to be mounted on the oil loading unit 165.

Meanwhile, the fifth injection hole 351 is formed with a sealing part for blocking the input of the oil. The sealing part prevents the oil stored in the fifth solution storage unit 350 from being introduced into the input channel after the cartridge 3 is mounted on the genetic diagnosis chip 1 and is formed so that, when the external heat having a predetermined temperature or higher is applied, the oil is input into the oil loading unit 165. The sealing part may be formed of, for example, paraffin wax, but the present disclosure is not limited thereto, and the sealing part may be formed of any material that is melted by the heat having a predetermined temperature or higher.

Each of the above-described injection holes may communicate with the solution storage unit at a position farthest from a rotary shaft of the genetic diagnosis chip so that, when the genetic diagnosis chip rotates, the corresponding solution is injected into the genetic diagnosis chip through the injection hole. Accordingly, since the centrifugal force generated when the genetic diagnosis chip rotates may be completely applied to the solution stored in the solution storage unit, a dead space phenomenon can be prevented in which the solution is not discharged from the inside to the outside and remains in the solution storage unit.

Next, referring to FIG. 7C, the cartridge 3 includes, on the upper surface thereof, a first distribution hole 312, a second distribution hole 322, a third distribution hole 332, a fourth distribution hole 342, and a fifth distribution hole 352 formed to correspond to the first solution storage unit 310, the second solution storage unit 320, the third solution storage unit 330, the fourth solution storage unit 340, and the fifth solution storage unit 350, respectively. In this case, the size of each of the distribution holes is formed to be smaller than the size of a space formed by each of the solution storage units, and thus the air pressure inside each of the solution storage units may be distributed.

Figure 8:
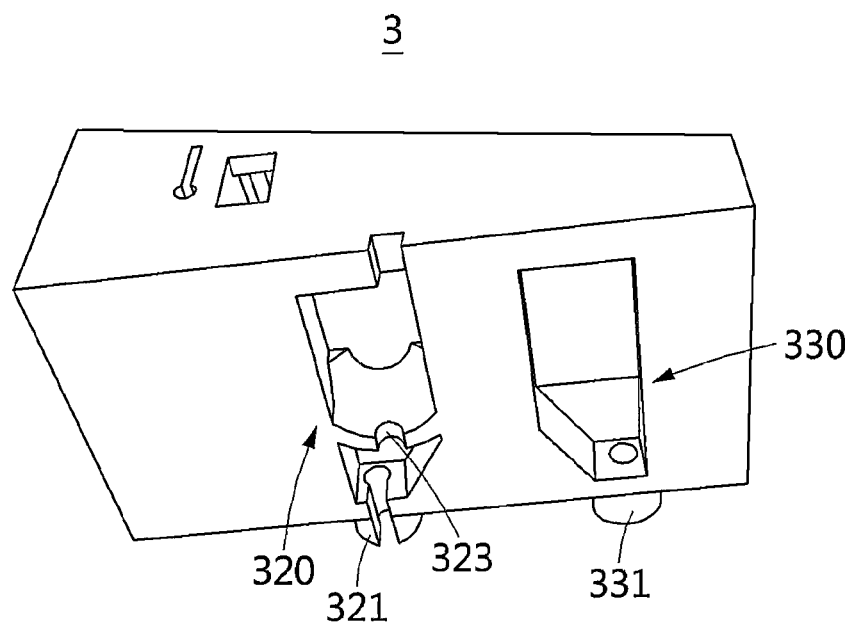
FIG. 8 is a cross-sectional view of the cartridge of the genetic diagnosis chip according to the first embodiment.

FIG. 8 is a cross-sectional view of the cartridge of the genetic diagnosis chip according to the first embodiment.

FIG. 8 is a detailed cross-sectional view of the second solution storage unit that stores the washing liquid and the third solution storage unit that stores the eluent.

As described above, 70% ethanol is mainly used as the washing liquid stored in the washing liquid storage unit 120, and there is a problem in that the ethanol leaks due to the pressure generated when the cartridge 3 is mounted on the genetic diagnosis chip 1. In order to solve this leakage problem, the second solution storage unit 320 has a manual valve 323 formed therein to prevent the leakage of the washing liquid, and the second solution storage unit 320 is divided into an upper space and a lower space by the manual valve 323. The manual valve 323 is located between the upper space and the lower space to allow the washing liquid to be collected in the upper space. Further, the manual valve 323 is formed with a hole having a predetermined diameter so that the washing liquid stored in the upper space is gradually injected into the lower space through the hole.

Meanwhile, the lower space formed between the manual valve 323 and the first injection hole 311 has an upper end connected to the manual valve 323 and a lower end connected to the first injection hole 311. One side wall of the lower space is formed to be inclined by a predetermined angle with respect to the rotary shaft of the genetic diagnosis chip 1. Further, a space of the third solution storage unit 330 that corresponds to the lower space of the second solution storage unit 320 is formed to face the one side wall of the lower space of the second solution storage unit 320 with respect to the rotary shaft of the genetic diagnosis chip 1. Accordingly, as the genetic diagnosis chip 1 rotates or rotates in reverse about the rotary shaft located between the second solution storage unit 320 and the third solution storage unit 330, the washing liquid stored in the second solution storage unit 320 and the eluent stored in the third solution storage unit 330 may be injected into a genetic diagnosis device through the injection holes.

4. Cartridge of Genetic Diagnosis Chip According to Second Embodiment

Figure 9:
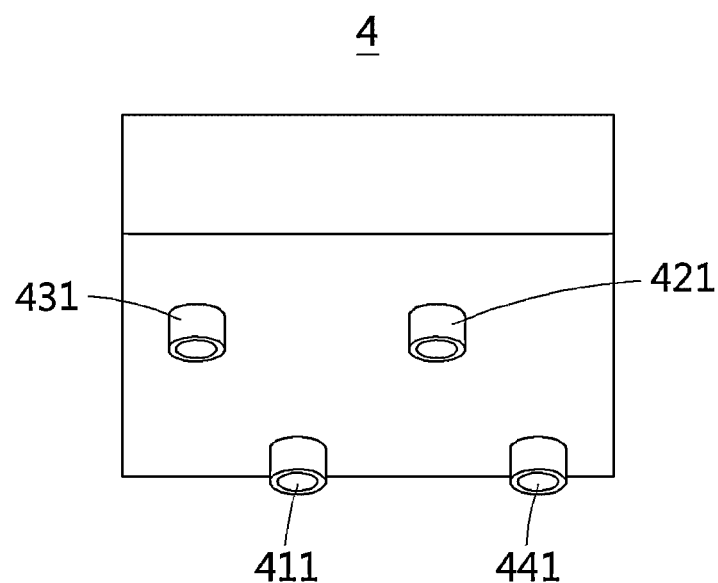
FIG. 9 is a view illustrating a cartridge of the genetic diagnosis chip according to a second embodiment.

FIG. 9 is a view illustrating a cartridge of the genetic diagnosis chip according to a second embodiment. Hereinafter, a detailed description of a configuration duplicated with the above-described cartridge of the genetic diagnosis chip according to the first embodiment will be omitted.

Referring to FIG. 9, since the genetic diagnosis chip 1 according to the second embodiment includes the oil chamber that stores the oil, a cartridge 4 includes the remaining components except for the components for storing and injecting the oil. That is, the cartridge 4 includes a first solution storage unit that stores the sample, a second solution storage unit that stores the washing liquid, a third solution storage unit that stores the eluent, and a fourth solution storage unit that stores the cocktail, and the storage units respectively include a first injection hole 411, a second injection hole 421, a third injection hole 431, and a fourth injection hole 441 for being mounted on the genetic diagnosis chip 1.

When the respective injection holes are mounted on the genetic diagnosis chip 1, the stored solutions are injected into the genetic diagnosis chip 1 from the solution storage units corresponding to the respective injection holes. Meanwhile, after the target material is injected into each reaction chamber of the genetic diagnosis chip 1, as heat having a predetermined temperature or higher is applied to the sealing part of the oil chamber, the oil is injected into the input channel.

5. Target Material Detection Process

FIGS. 10A to 10L are views for describing a process of detecting a target material using the genetic diagnosis chip according to the embodiment of the present disclosure. Hereinafter, a process of detecting a target material through the genetic diagnosis chip according to the second embodiment will be described.

Figure 10A:
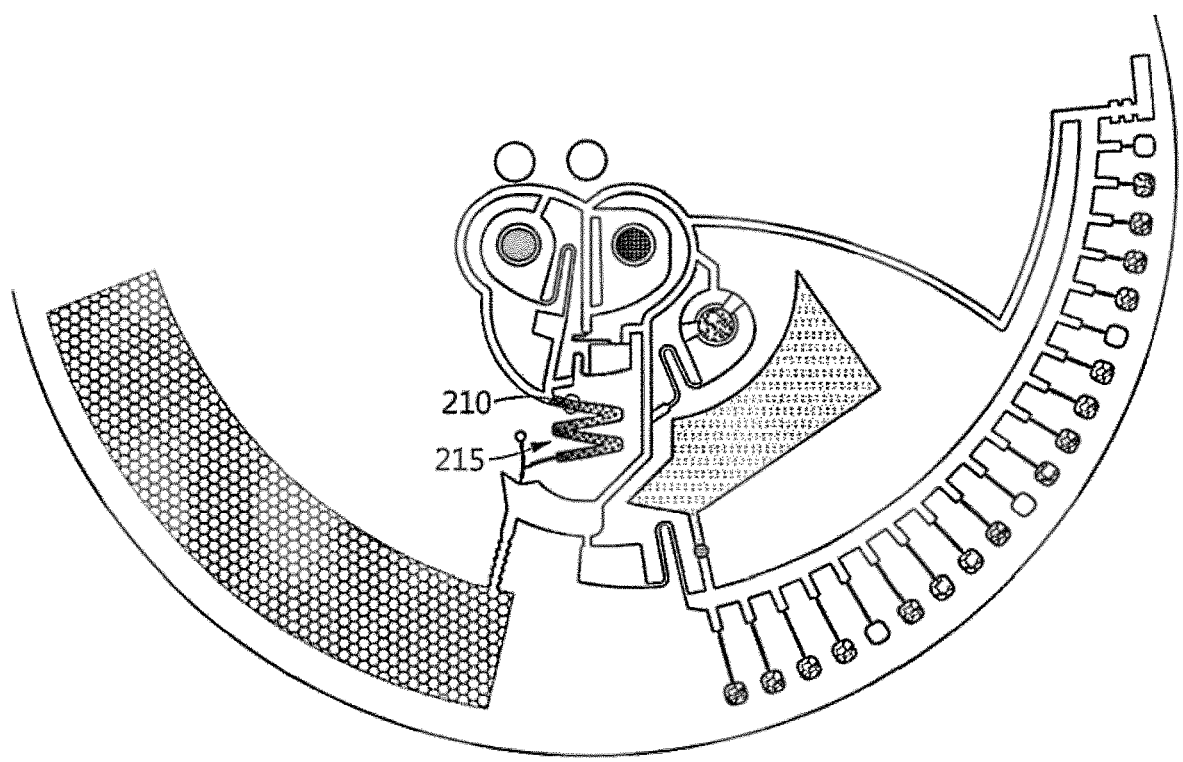

In FIG. 10A, in order to detect the target material, first, each of the injection holes of the cartridge are inserted into one of the storage units of the genetic diagnosis chip, and thus the cartridge is mounted on the genetic diagnosis chip. Accordingly, the solutions stored in the solution storage units of the cartridge are injected into the storage units of the genetic diagnosis chip, and the sample is injected into a sample loading unit 210.

Figure 10B:
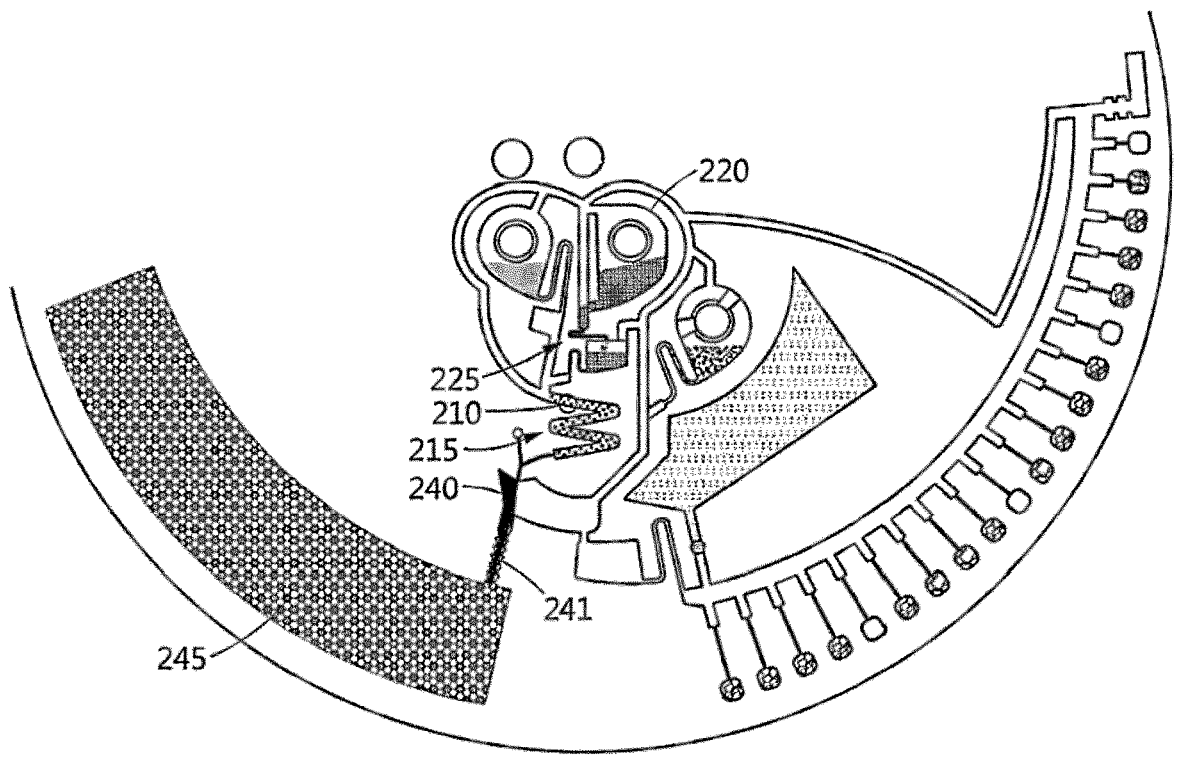

In FIG. 10B, the genetic diagnosis chip 1 rotates about the rotary shaft in a first direction at a rotation speed of 5000 rpm for 60 seconds. According to the rotation, the sample injected through the sample loading unit 210 passes through a capture channel 215 and is injected into a waste liquid chamber 245 through a second connection channel 241, and the sample injected into the waste liquid chamber 245 is adsorbed by a superabsorbent polymer of the waste liquid chamber 245. In this process, the target material contained in the sample is adsorbed onto a bead of the capture channel.

Further, the washing liquid injected into a washing liquid storage unit 220 flows into a delay unit 225.

Figure 10C:
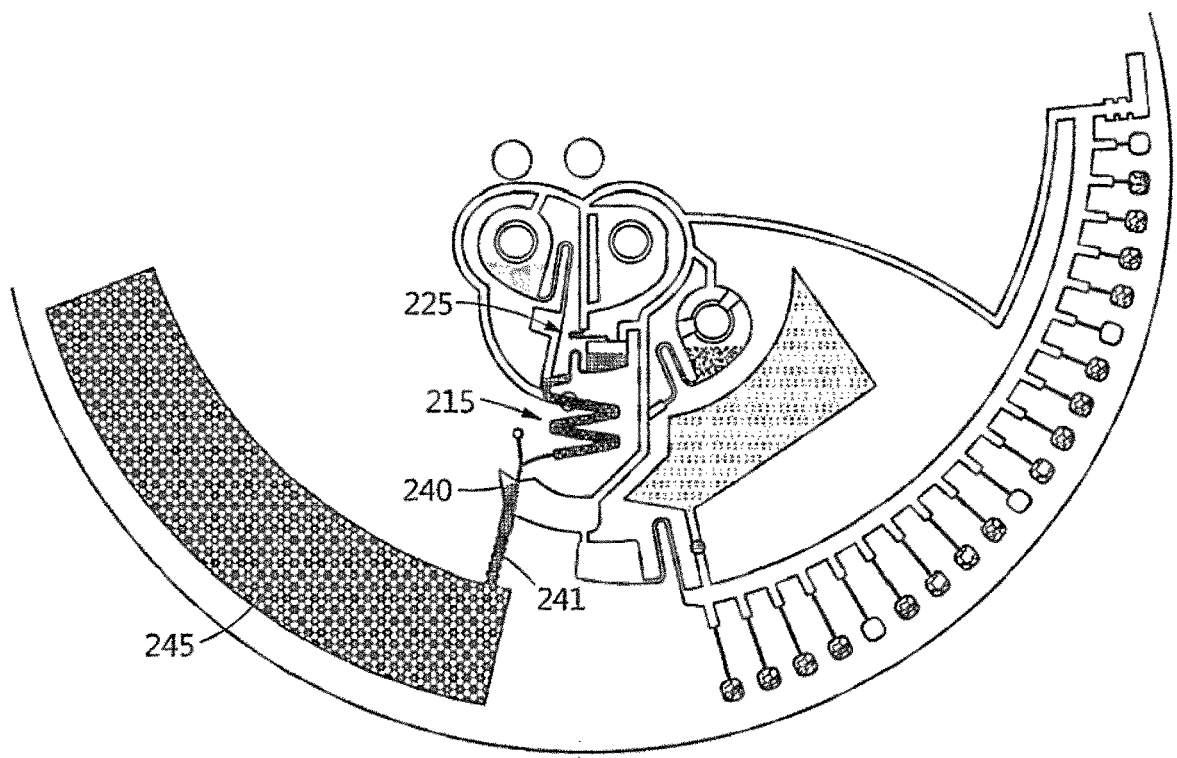

In FIG. 10C, as the genetic diagnosis chip 1 continuously rotates, the washing liquid flowing into and stored in the delay unit 225 flows through the capture channel 215 into the waste liquid chamber 245. In this case, while passing through the capture channel 215, the washing liquid separates, from the capture channel 215, the remaining materials excluding the target material captured in the capture channel 215.

Figure 10D:
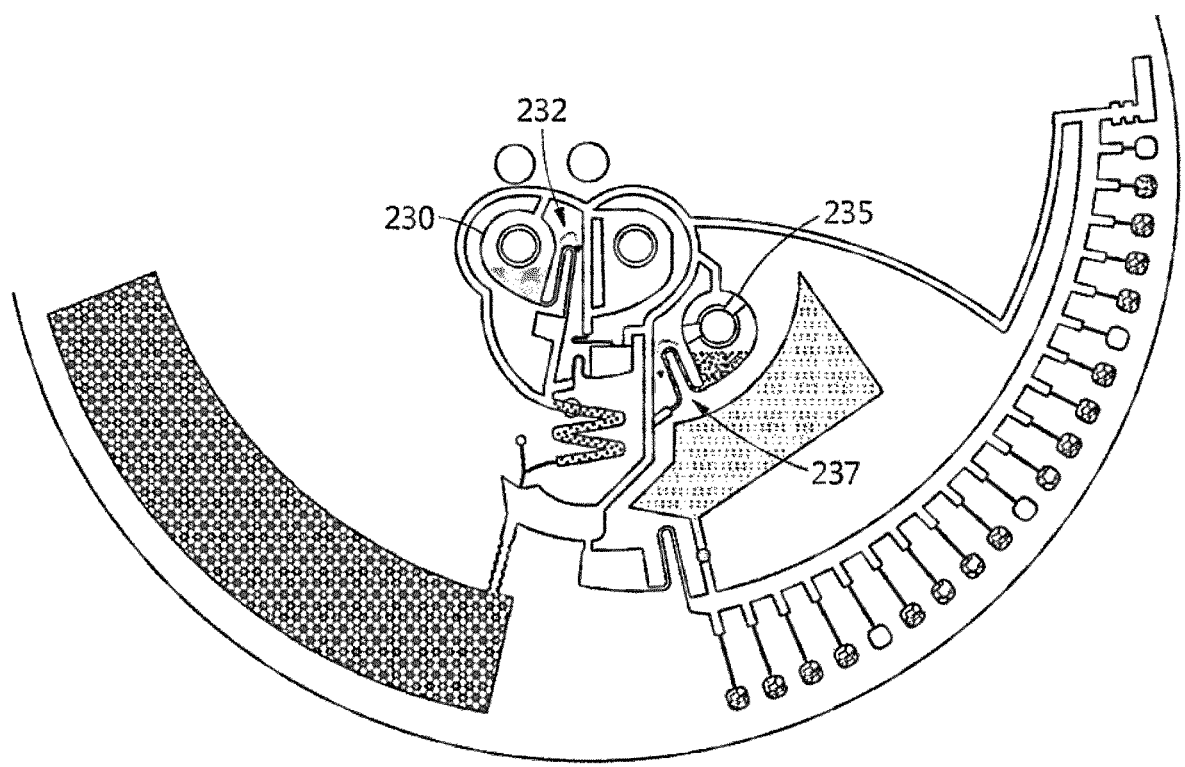

In FIG. 10D, when the genetic diagnosis chip 1 is stored for 10 seconds, the centrifugal force due to the rotation is removed. Thus, due to a capillary force, the eluent stored in the eluent storage unit 230 and the cocktail stored in the cocktail storage unit 235 pass through an eluent introduction channel 232 and a cocktail introduction channel 237, respectively.

Figure 10E:
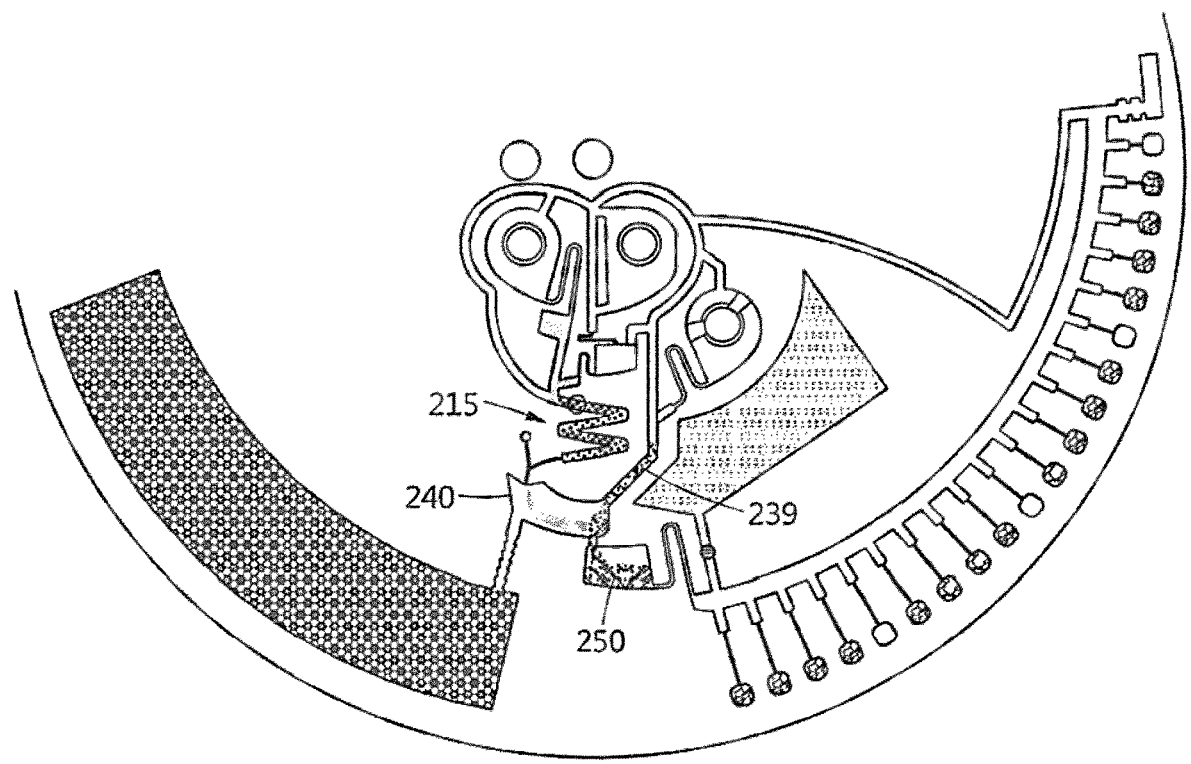

In FIG. 10E, the genetic diagnosis chip 1 rotates about the rotary shaft in a second direction at a rotation speed of 5000 rpm for 10 seconds. According to the rotation, the eluent passing through the eluent introduction channel 232 passes through the capture channel 215, and the cocktail passing through the cocktail introduction channel 237 passes through a first connection channel 239, is injected into a connection chamber 240, and is injected into the collection chamber 250 immediately after being injected into the connection chamber 240. In this case, while passing through the capture channel 215, the eluent separates the target material captured in the capture channel 215.

Figure 10F:
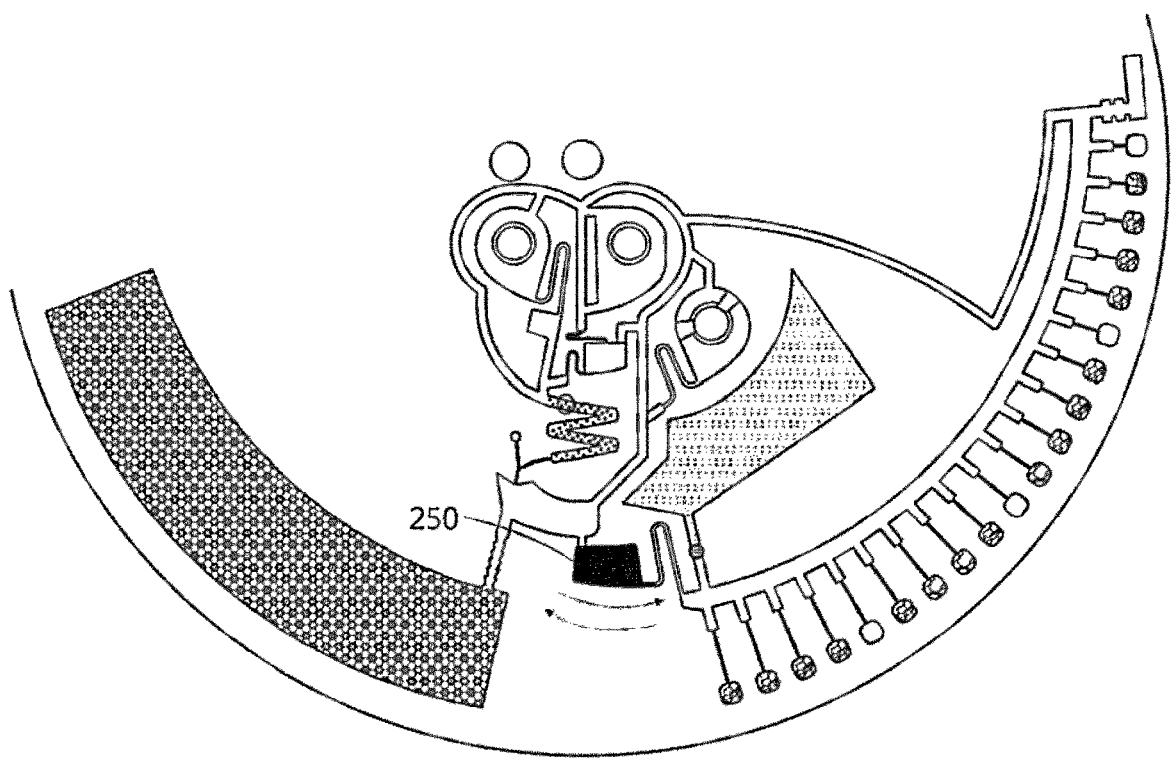

In FIG. 10F, the genetic diagnosis chip 1 rotates about the rotary shaft alternately in the first direction or the second direction at a rotation speed of 1000 rpm for 30 seconds. According to the rotation, the eluent containing the target material injected into the collection chamber 250 and the cocktail are mixed with each other to form a mixture.

Figure 10G:
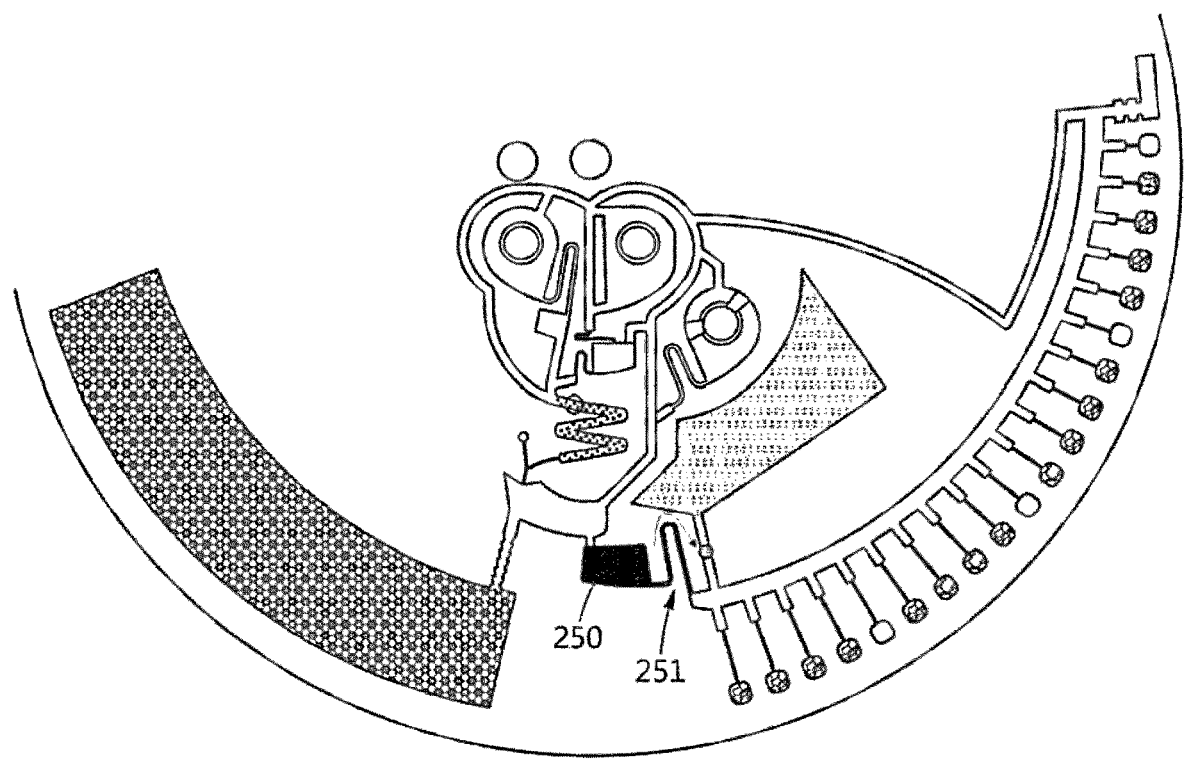

In FIG. 10G, when the genetic diagnosis chip 1 is stopped, the centrifugal force caused by the rotation is removed, and thus the mixture generated in the collection chamber 250 passes through a mixture introduction channel 251 by the capillary force.

Figure 10H:
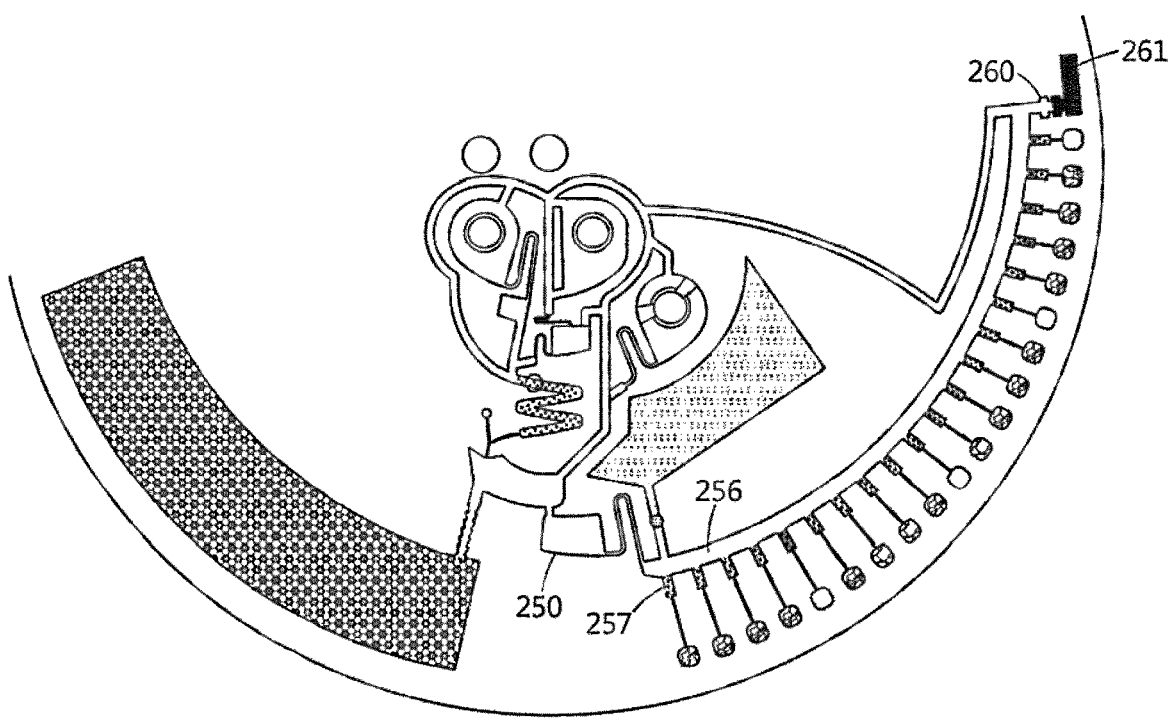

In FIG. 10H, the genetic diagnosis chip 1 rotates about the rotary shaft in the second direction at a rotation speed of 1000 rpm for 30 seconds. According to the rotation, the mixture is injected into the one or more input outlets 257 extending by a predetermined length in a circumferential direction and formed outside the input channel 256 having an aliquoting structure. That is, the mixture is sequentially injected into the input outlets 257 of the input channel 256 in the circumferential direction from a point at which the collection chamber 250 and the input channel 256 are connected. Further, the surplus mixture that has not been injected into the input outlets 157 of the input channel 256 is injected into a surplus mixture storage chamber 261 through the fourth connection channel 260.

Figure 10I:
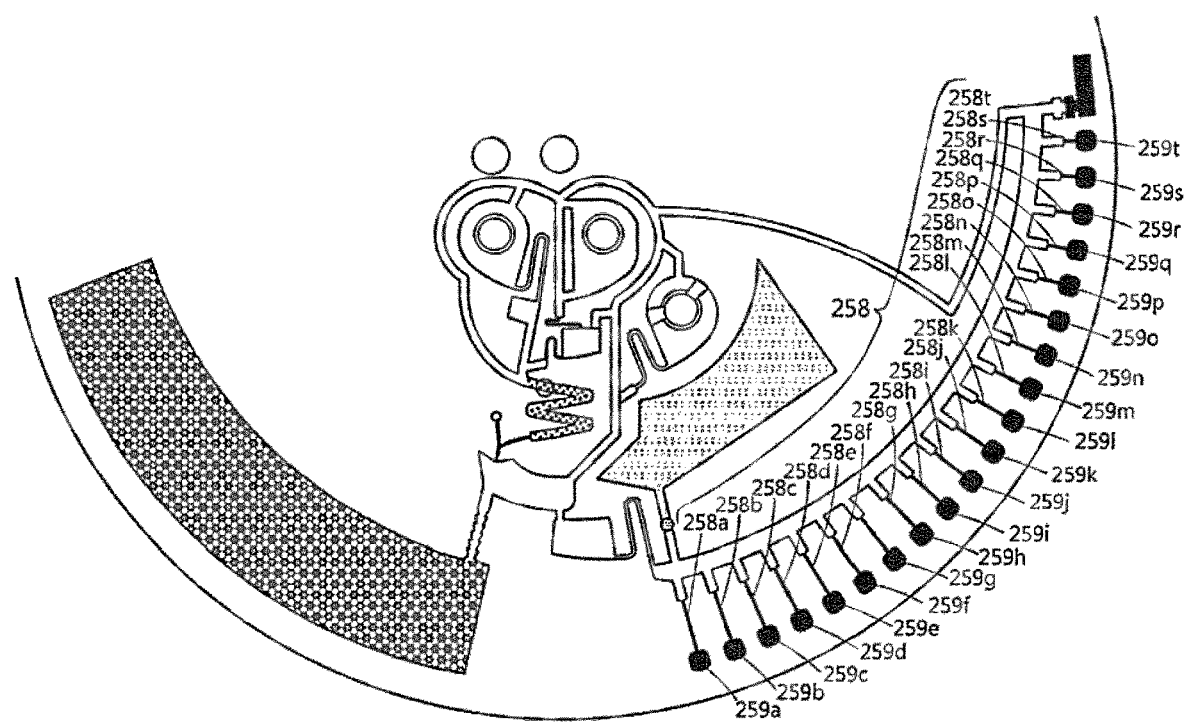

In FIG. 10I, the genetic diagnosis chip 1 rotates about the rotary shaft in the second direction at a rotation speed of 5000 rpm for 10 seconds. According to the rotation, the mixture that has been injected into the input outlet 157 of the input channel 256 is injected into reaction chambers 259a to 259t through third connection channels 258a to 258t, respectively.

Figure 10J:
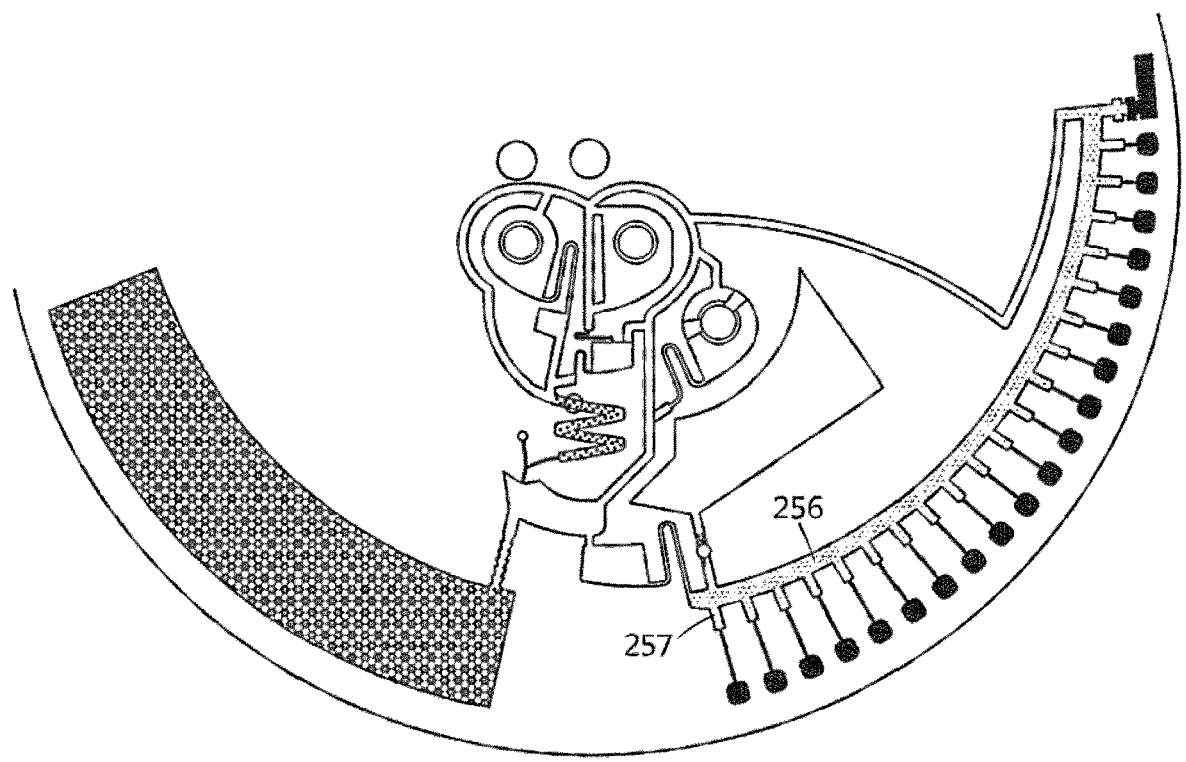

In FIG. 10J, the genetic diagnosis chip 1 is stopped, and heat of 60° C. is applied to the sealing part 266 that seals the oil stored in the oil chamber 265. In this case, the heat applied to the sealing part 266 may be set differently according to the material of the sealing part 266.

Figure 10K:
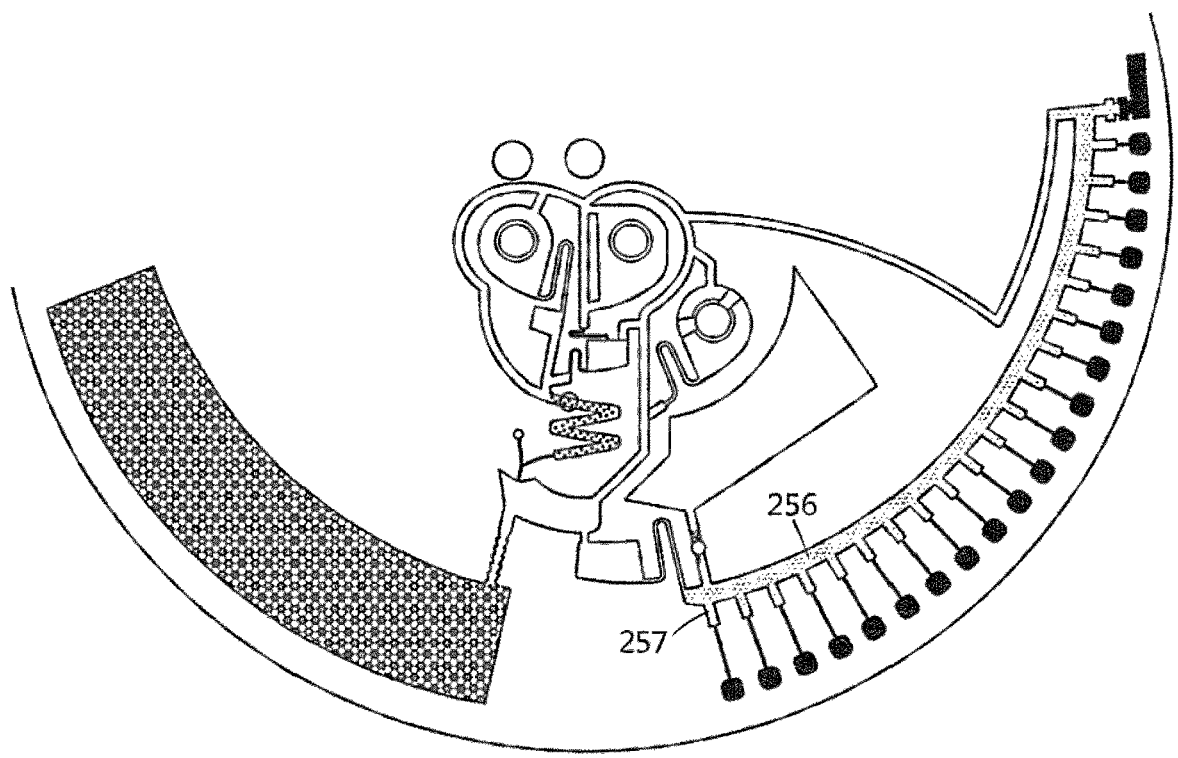
Figure 101:
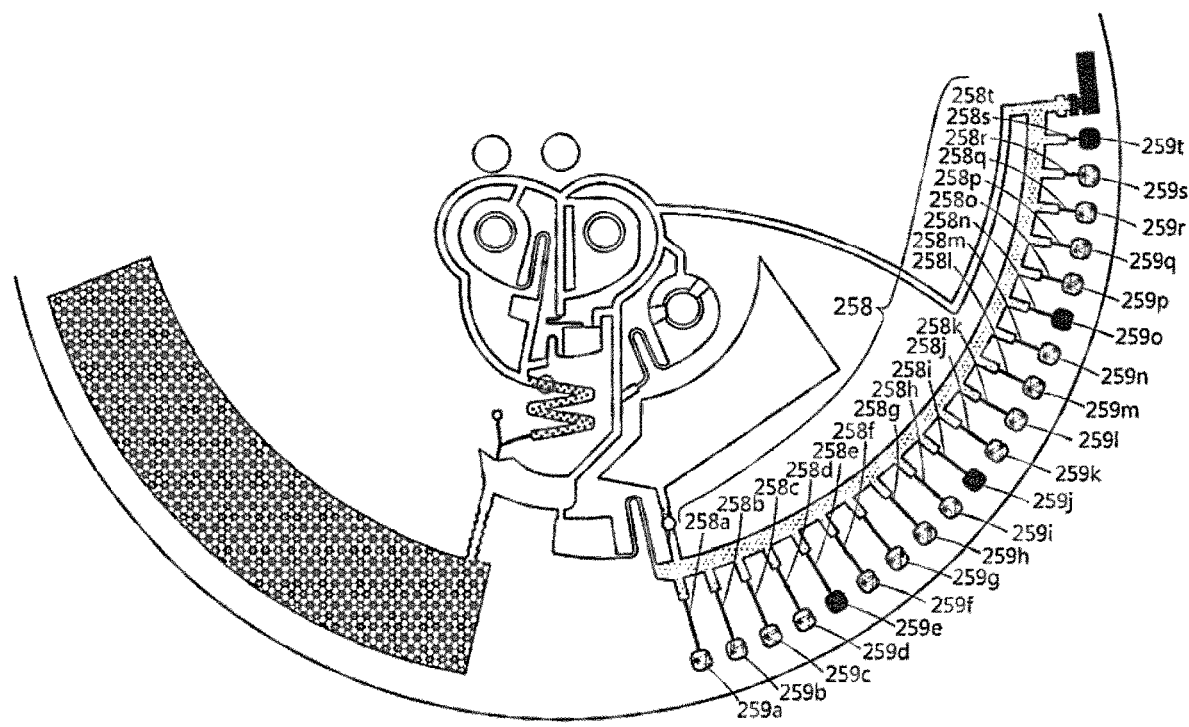

In FIG. 10K, when the heat is applied to the sealing part 266, the sealing part 266 is melted, and thus the oil stored in the oil chamber 265 is injected into the input channel 256. Accordingly, the oil injected into the input channel 256 and the input outlets 257 may prevent the evaporation of the mixture distributed into the respective reaction chambers 259a to 259t.

In FIG. 10L, the PCR or RT-PCR is performed in the reaction chambers 259a to 259t. In this case, the respective reaction chambers 259a to 259t may store different primers or may not store the primer. The PCR includes a denaturation step, an annealing step, and an elongation step. In order to perform the PCR, heat corresponding to a temperature required for each step of PCR is applied to the respective reaction chambers 259a to 259t through an external heat source. Since the PCR is widely known to those skilled in the art, a detailed description of the PCR will be omitted.

When the gene amplification process is completed through performing the PCR, the target material may be detected through discoloration of the indicator, a fluorescence detection method, or the like.

6. Experimental Example

The genetic diagnosis chip according to the related art includes a separate sample storage unit radially inward from the capture channel and allows the sample stored in the sample storage unit to flow to the capture channel. In contrast, the genetic diagnosis chip according to the present disclosure does not include a separate sample storage unit as described above but includes a sample loading unit communicating with the capture channel, thereby increasing the pretreatment efficiency of the sample.

This experiment was performed to identify a difference between the pretreatment efficiencies of the genetic diagnosis chip according to the present disclosure and the genetic diagnosis chip according to the related art.

Figure 11:
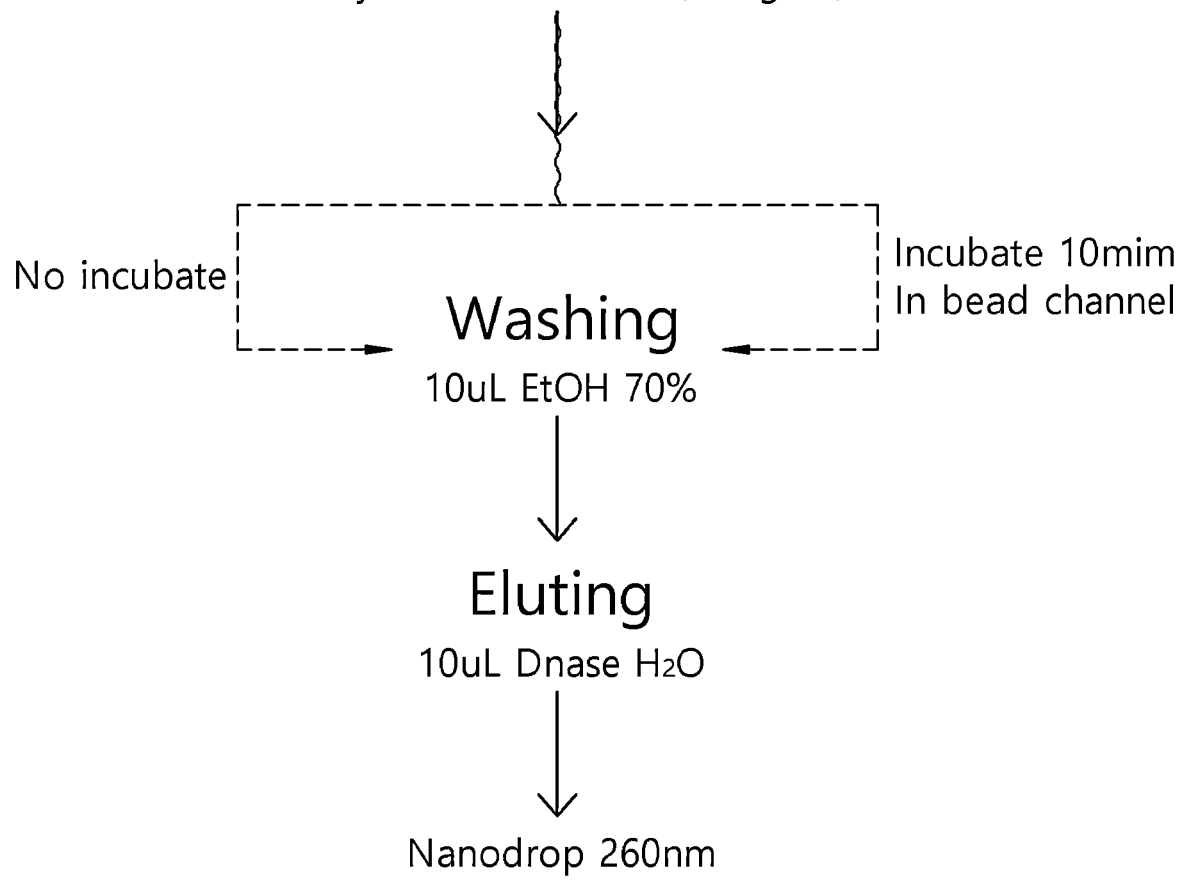
FIG. 11 is a flowchart for describing a comparison between sample pretreatment processes of the genetic diagnosis chip according to the embodiment of the present disclosure and a genetic diagnosis chip according to a related art.

FIG. 11 is a flowchart for describing a comparison between sample pretreatment processes of the genetic diagnosis chip according to the embodiment of the present disclosure and a genetic diagnosis chip according to a related art.

Referring to FIG. 11, the sample used in this experimental example was a 10 μL sample in which a 7.5 μL *Salmonella* 5.1 (±0.2 ng/μL) and a 2.5 μL Gu-HCl solution were mixed, the washing liquid was a 10 μL 70% ethanol solution, and the eluent was a 10 μL Dnase H$_2$O solution.

When the pretreatment process is performed by the genetic diagnosis chip according to the embodiment of the present disclosure, the sample is injected by the sample loading unit formed on the capture channel, and thus an incubation process is performed in the capture channel for 10 min. When the pretreatment process is performed by the genetic diagnosis chip according to the related art, the sample stored in the separately provided sample storage unit passes through the capture channel without the incubation process. The subsequent pretreatment process is the same as that described above. The absorbance values obtained by measuring the amount of DNA obtained after the sample pretreatment at 260 nm using a nanodrop device are represented below in Table 1.

TABLE 1

|  | Incubation of 10 min (ng/μL) | No incubation (ng/μL) |
|---|---|---|
| Repeat 1 | 2 | 1.3 |
| Repeat 2 | 1.7 | 1.1 |
| Repeat 3 | 1.8 | 0.8 |
| Average | 1.8 | 1.1 |
| SD | 0.2 | 0.3 |
| % Recovery | 47.9 | 27.9 |

* Incubation of 10 min in the bead channel before washing: 1.8 ± 0.2 ng/μL(47.9% recovery)
*No incubation: 1.1 ± 0.3 ng/μL(27.9% recovery)

Referring to Table 1, it can be seen that in a case in which the washing is performed after the incubation for about 10 minutes in the capture channel by the genetic diagnosis chip according to the embodiment of the present disclosure, DNA recovery is represented that is 20% higher than other cases, and thus the efficiency of the sample pretreatment is further improved.

According to the embodiment of the present disclosure, all genetic diagnosis can be performed using one chip.

In addition, further improved sample pretreatment efficiency can be exhibited.

Further, various pathogens can be diagnosed on a site, food poisoning bacteria, that is, viruses/bacteria infecting food, are diagnosed on a site, and thus problems occurring in the distribution of meals that are widespread in kindergartens and elementary/middle/high schools can be continuously monitored.

As described above, although the embodiments have been described with reference to the limited drawings, various modifications and changes may be made based on the above description by those skilled in the art. For example, even though the described technologies are performed in an order different from the described method, and/or the described components such as a system, a structure, a device, and a circuit are coupled or combined in a form different from the described method or are replaced or substituted by other components or equivalents, appropriate results may be achieved.

Therefore, other implementations, other embodiments, and those equivalent to the appended claims also belong to the scope of the appended claims.

What is claimed is:

1. A genetic diagnosis chip comprising one or more unit processing parts, wherein the unit processing part includes:
    a pretreatment section, formed on a surface of the genetic diagnosis chip, that loads a sample and performs a pretreatment process on a target material in the loaded sample; and
    a distribution section, formed on the surface, which is located radially outward from the pretreatment section and in which the target material pretreated through the pretreatment section is distributed and detection of the distributed target material is performed,
    wherein the pretreatment section includes: a sample loading section, formed on the surface, that loads the sample;
    a capture channel which captures the target material from the loaded sample, the sample loading section being formed on the capture channel;
    a washing liquid storage section, formed on the surface, which is located radially inward from the capture channel to communicate with the capture channel and in which a washing liquid for washing materials excluding the target material captured in the capture channel is stored; and a delay section formed on the surface and provided between the capture channel and the washing liquid storage section and configured to delay passage of the washing liquid so that the washing liquid reaches the capture channel later than the sample, wherein the delay section includes:

a delay chamber in which the washing liquid that is headed toward the capture channel from the washing liquid storage section is stored; and a delay channel which is provided between the delay chamber and the capture channel and allows the washing liquid stored in the delay chamber to be discharged to the capture channel when an amount of the washing liquid is greater than or equal to a predetermined amount, wherein the delay channel comprises: a first delay path extending radially inward from an outlet of the delay chamber; and a second delay path extending radially outward from an end of the first delay path, the first delay path and the second delay path being aligned to let the washing liquid flow in opposite directions to each other, and wherein a length of the first delay path with respect to a radially inward direction corresponds to a discharge level of the washing liquid stored in the delay chamber, such that the washing liquid stored in the delay chamber is configured to be discharged when having reached the discharge level or more.

2. The genetic diagnosis chip of claim 1, wherein the pretreatment section further includes:

an eluent storage section, formed on the surface, which is located radially inward from the capture channel to communicate with the capture channel and in which an eluent for separating the target material captured in the capture channel is stored.

3. The genetic diagnosis chip of claim 2, wherein the unit processing part further includes:

a cocktail storage section, formed on the surface, which is located radially outward from the eluent storage section and in which a cocktail is stored;

a connection chamber which is located radially outward from the capture channel and the cocktail storage section and communicates with an outlet of the capture channel and the cocktail storage section; and a collection chamber which is located radially outward from the connection chamber and communicates with the connection chamber and in which the eluent containing the pretreated target material and the cocktail are stored and mixed.

4. The genetic diagnosis chip of claim 3, wherein the distribution section includes:

an input channel which communicates with the collection chamber and distributes a mixture in which the eluent including the pretreated target material and the cocktail are mixed; and one or more reaction chambers that accommodate the mixture distributed through the input channel and in which a polymerase chain reaction (PCR) or a reverse Transcription PCR (RT-PCR) is performed on the distributed mixture, wherein the one or more reaction chambers store primers for detecting the target material contained in the distributed mixture.

5. The genetic diagnosis chip of claim 4, wherein the distribution section further includes one or more connection channels for connecting one or more outlets formed radially outside the input channel and the one or more reaction chambers.

6. The genetic diagnosis chip of claim 3, wherein the unit processing part further includes a waste liquid chamber which is located radially outward from the connection chamber to communicate with the connection chamber and in which the sample and the washing liquid passing through the capture channel are stored.

7. The genetic diagnosis chip of claim 6, wherein a superabsorbent polymer that absorbs the sample passing through the capture channel is attached to an inside of the waste liquid chamber.

8. The genetic diagnosis chip of claim 3, wherein injection holes for injecting a solution are formed in the washing liquid storage section, the eluent storage section, and the cocktail storage section.

9. The genetic diagnosis chip of claim 4, wherein the unit processing part further includes an oil loading section which is located radially inward from the distribution section to communicate with the input channel and loads an oil input to the input channel to prevent evaporation of the mixture after the mixture is distributed.

10. The genetic diagnosis chip of claim 9, wherein the oil input is loaded into the input channel when external heat having a predetermined temperature or higher is applied.

* * * * *